United States Patent
Dai et al.

(10) Patent No.: US 12,035,201 B2
(45) Date of Patent: Jul. 9, 2024

(54) DETERMINING COMMUNICATION NODES FOR RADIO FREQUENCY (RF) SENSING

(71) Applicant: QUALCOMM Incorporated, San Diego, CA (US)

(72) Inventors: Yucheng Dai, San Diego, CA (US); Sony Akkarakaran, Poway, CA (US); Wooseok Nam, San Diego, CA (US); Jingchao Bao, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/578,986

(22) Filed: Jan. 19, 2022

(65) Prior Publication Data
US 2023/0232183 A1    Jul. 20, 2023

(51) Int. Cl.
*H04W 4/029* (2018.01)
*H04W 4/02* (2018.01)
*H04W 8/00* (2009.01)
*H04W 24/10* (2009.01)
*H04W 4/021* (2018.01)

(52) U.S. Cl.
CPC .......... *H04W 4/029* (2018.02); *H04W 4/023* (2013.01); *H04W 4/027* (2013.01); *H04W 8/005* (2013.01); *H04W 24/10* (2013.01); *H04W 4/021* (2013.01)

(58) Field of Classification Search
CPC ..... H04W 4/029; H04W 4/023; H04W 4/027; H04W 8/005; H04W 24/10; H04W 4/021
See application file for complete search history.

(56) References Cited

U.S. PATENT DOCUMENTS

| | | | | |
|---|---|---|---|---|
| 11,068,721 | B2 * | 7/2021 | Pan | G06T 7/73 |
| 11,076,264 | B2 * | 7/2021 | Nowakowski | G01S 5/0252 |
| 11,164,329 | B2 * | 11/2021 | Hallett | G08B 13/196 |
| 11,375,336 | B2 * | 6/2022 | Wirola | G06Q 30/02 |

(Continued)

FOREIGN PATENT DOCUMENTS

| | | | |
|---|---|---|---|
| WO | WO-2020245834 A1 * | 12/2020 | G01S 11/04 |
| WO | 2022008064 A1 | 1/2022 | |
| WO | WO-2023222502 A1 * | 11/2023 | |

OTHER PUBLICATIONS

International Search Report and Written Opinion—PCT/US2022/082079—ISA/EPO—dated Mar. 15, 2023.

(Continued)

*Primary Examiner* — Adam D Houston
(74) *Attorney, Agent, or Firm* — Polsinelli

(57) ABSTRACT

Disclosed are systems and techniques for wireless communications. For example, a process can include determining a subset of radio frequency (RF) sensing devices from a plurality of available RF sensing devices for performing an RF sensing technique for a target object. The subset of RF sensing devices may be determined based on a plurality of factors associated with the plurality of available RF sensing devices. The process can include transmitting, to at least one RF sensing device of the subset of RF sensing devices, at least one message instructing the subset of RF sensing devices to perform the RF sensing technique for the target object to obtain one or more characteristics of the target object.

30 Claims, 14 Drawing Sheets

(56) References Cited

U.S. PATENT DOCUMENTS

| | | | |
|---|---|---|---|
| 2012/0046044 A1* | 2/2012 | Jamtgaard | G01S 5/02585 455/456.1 |
| 2015/0301153 A1* | 10/2015 | Foxlin | G01S 5/163 367/128 |
| 2016/0259061 A1* | 9/2016 | Carter | G01S 19/28 |
| 2018/0035251 A1 | 2/2018 | Bitra | |
| 2021/0208232 A1* | 7/2021 | Alwood | G01S 5/0284 |
| 2021/0263142 A1* | 8/2021 | Alwood | G01S 19/54 |
| 2022/0015057 A1* | 1/2022 | Bao | H04W 76/14 |
| 2022/0110088 A1* | 4/2022 | Bao | G01S 5/0205 |
| 2022/0303787 A1* | 9/2022 | Pratt | H04W 64/00 |
| 2022/0322277 A1* | 10/2022 | Duan | H04B 17/27 |
| 2022/0329968 A1* | 10/2022 | Raj | H04W 4/80 |
| 2022/0353843 A1* | 11/2022 | Bao | H04W 64/003 |
| 2022/0381898 A1* | 12/2022 | Zhang | G01S 7/006 |
| 2023/0094751 A1* | 3/2023 | Nam | G01S 1/042 370/329 |
| 2023/0232183 A1* | 7/2023 | Dai | H04W 4/027 455/456.1 |
| 2023/0236038 A1* | 7/2023 | Hayashi | G01S 5/16 701/300 |
| 2023/0309132 A1* | 9/2023 | Duan | G01S 7/021 |
| 2023/0314584 A1* | 10/2023 | Gummadi | G01S 13/46 342/58 |
| 2023/0327923 A1* | 10/2023 | Yapici | H04W 52/0225 |
| 2023/0333242 A1* | 10/2023 | Tadayon | G01S 13/765 |
| 2023/0345204 A1* | 10/2023 | Dai | H04W 4/029 |
| 2023/0396958 A1* | 12/2023 | Lund | H04W 4/027 |

OTHER PUBLICATIONS

Kanhere O., et al., "Target Localization using Bistatic and Multistatic Radar with 5G NR Waveform", 2021 IEEE 93rd Vehicular Technology Conference (VTC2021-Spring), IEEE, Apr. 25, 2021, 7 Pages, XP033926190, Retrieved on Jun. 8, 2021, Abstract Sections I and II, Figures 1,2.

* cited by examiner

Illustration of Geometric Dilution of Precision (GDOP)

DETERMINING COMMUNICATION NODES FOR RADIO FREQUENCY (RF) SENSING

FIELD OF THE DISCLOSURE

The present disclosure generally relates to radio frequency (RF) sensing. For example, aspects of the disclosure relate to systems and techniques for scheduling communication nodes (e.g., transmit nodes and/or receive nodes) for RF sensing (e.g., monostatic, bistatic, and/or multistatic sensing) of target objects.

BACKGROUND OF THE DISCLOSURE

Wireless communications systems are widely deployed to provide various types of communication content, such as voice, video, packet data, messaging, and broadcast. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between UEs, which may involve direct transmissions between two or more UEs.

Radar sensing systems typically use RF waveforms to estimate the location (e.g., including distance, angle, and/or velocity) of a target object, such as a vehicle, an obstruction, a user, a building, or other object. A typical radar system includes at least one transmitter (e.g., a base station) and at least one receiver (e.g., UE). Due to a number of related factors (e.g., the locations of the transmitters and the receivers in relation to the target object), the estimation of the target object's location will have some errors and amount of uncertainty.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for determining communication nodes (e.g., transmit and/or receive nodes) for RF sensing of target objects. According to at least one example, a method is provided for wireless communications. The method includes: determining a subset of radio frequency (RF) sensing devices from a plurality of available RF sensing devices for performing an RF sensing technique for a target object, the subset of RF sensing devices being determined based on a plurality of factors associated with the plurality of available RF sensing devices; transmitting, to at least one RF sensing device of the subset of RF sensing devices, at least one message instructing the subset of RF sensing devices to perform the RF sensing technique for the target object to obtain one or more characteristics of the target object.

In another example, an apparatus for wireless communications is provided that includes at least one memory (e.g., configured to store data, such as sensing data or measurements, location data, etc.) and at least one processor (e.g., implemented in circuitry) coupled to the memory. The at least one processor is configured to and can: determine a subset of radio frequency (RF) sensing devices from a plurality of available RF sensing devices for perform an RF sensing technique for a target object, the subset of RF sensing devices be determined based on a plurality of factors associated with the plurality of available RF sensing devices; transmit, to at least one RF sensing device of the subset of RF sensing devices, at least one message instructing the subset of RF sensing devices to perform the RF sensing technique for the target object to obtain one or more characteristics of the target object.

In another example, a non-transitory computer-readable medium is provided that has stored thereon instructions that, when executed by one or more processors, cause the one or more processors to: determine a subset of radio frequency (RF) sensing devices from a plurality of available RF sensing devices for perform an RF sensing technique for a target object, the subset of RF sensing devices be determined based on a plurality of factors associated with the plurality of available RF sensing devices; transmit, to at least one RF sensing device of the subset of RF sensing devices, at least one message instructing the subset of RF sensing devices to perform the RF sensing technique for the target object to obtain one or more characteristics of the target object.

In another example, an apparatus for wireless communications is provided. The apparatus includes: means for determining a subset of radio frequency (RF) sensing devices from a plurality of available RF sensing devices for performing an RF sensing technique for a target object, the subset of RF sensing devices being determined based on a plurality of factors associated with the plurality of available RF sensing devices; means for transmitting, to at least one RF sensing device of the subset of RF sensing devices, at least one message instructing the subset of RF sensing devices to perform the RF sensing technique for the target object to obtain one or more characteristics of the target object.

In some aspects, the apparatus is, or is part of, a mobile device (e.g., a mobile telephone or so-called "smart phone" or other mobile device), a wearable device, an extended reality (XR) device (e.g., a virtual reality (VR) device, an augmented reality (AR) device, or a mixed reality (MR) device), a personal computer, a laptop computer, a tablet computer, an Internet-of-Things (IoT) device, a wireless access point, a vehicle or component of a vehicle, a server computer, a robotics device, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
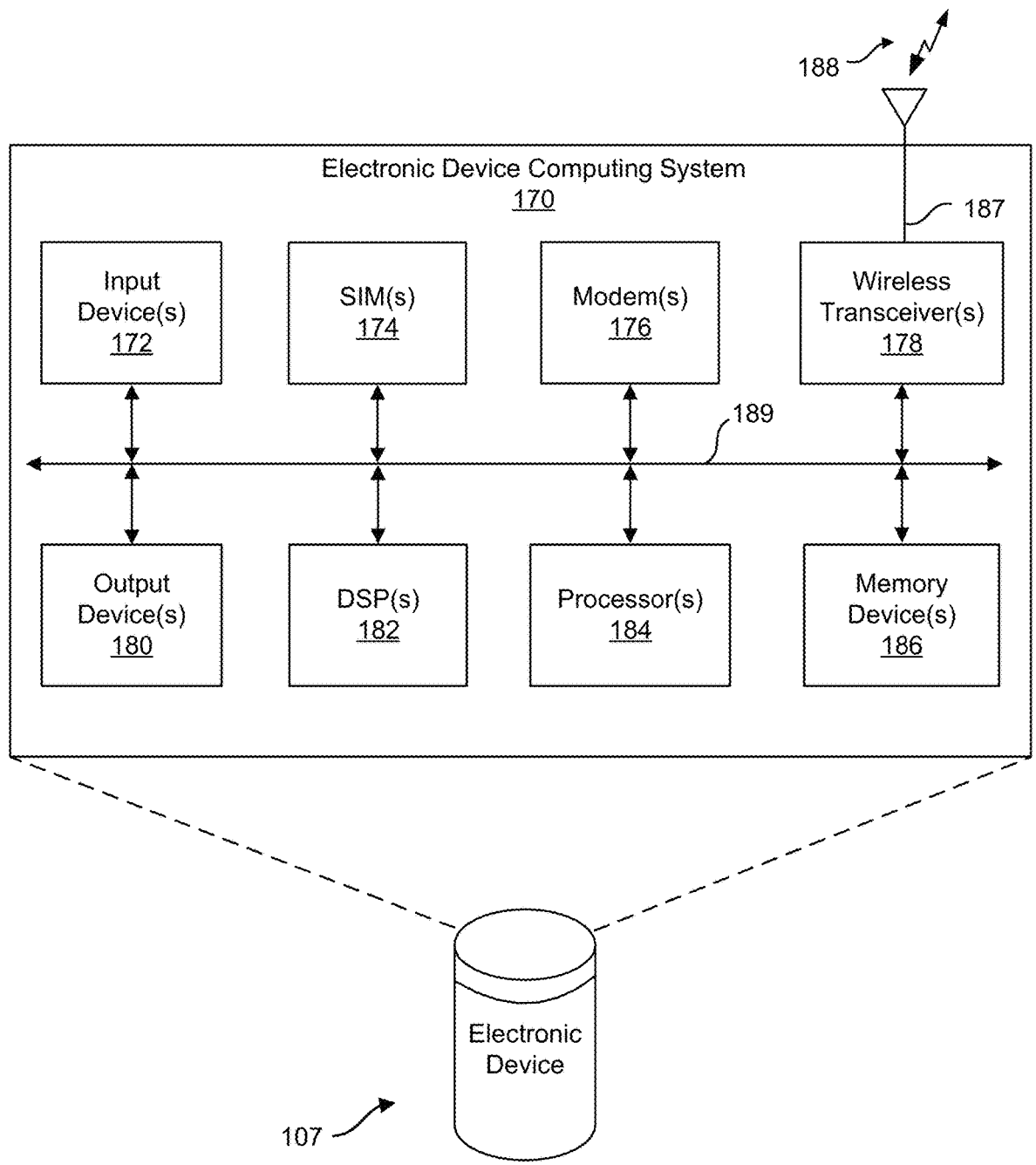
FIG. 1 is a block diagram illustrating an example of a computing system of an electronic device that may be employed by the disclosed systems and techniques for scheduling nodes for radio frequency (RF) sensing, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

In some cases, radar sensing systems are configured to use radio frequency (RF) waveforms to estimate a location (e.g., including distance, angle, and/or velocity) of a target object, such as a vehicle, an obstruction, a user, a building, or other object. For example, a radar system can include at least one transmitter (e.g., a transmit node), at least one receiver (e.g., a receive node), and at least one processor. A radar sensing system may perform monostatic sensing when one receiver is employed that is co-located with a transmitter. A radar system may perform bistatic sensing when one receiver of a first device is employed that is located remotely from a transmitter of a second device. Similarly, a radar system may perform multi-static sensing when multiple receivers of multiple devices are employed that are all located remotely from at least one transmitter of at least one device.

During operation of a radar sensing system in estimating the location of a target object, a transmitter of the radar sensing system transmits one or more electromagnetic (EM) signals (e.g., an RF sensing signal(s)) in the RF domain towards the target object. The signal reflects off of the target object to produce one or more reflection signals (e.g., an echo(s) of the RF sensing signal(s)), which provides information or properties regarding the target object, such as target's location and speed. At least one receiver of the radar sensing system receives the one or more reflection signals and at least one processor utilizes the information from the one or more reflection signals to determine information or properties of the target. In some cases, multiple radar sensing systems of different wireless devices may operate to determine the location of the target object. Each radar sensing system of a particular wireless device is referred to herein as a sensing node or sensing device.

Due to a number of related factors (e.g., the locations of transmitters and the receivers of the one or more radar sensing systems in relation to the target), the determination of the location of the target object may have some errors and amount of uncertainty. In some cases, the error/uncertainty can be related to a geometric dilution of precision (GDOP) of the sensing of the target object, which is a measure of the sensitivity of the location accuracy in the measurements of the RF sensing. For instance, GDOP is of higher quality when radar sensing systems (e.g., multiple devices) are uniformly distributed around the target object to obtain measurements from different directions.

Systems, apparatuses, processes (also referred to as methods), and computer-readable media (collectively referred to herein as systems and techniques) are described herein for determining or scheduling communication sensing nodes (e.g., transmit and/or receive sensing nodes) for performing RF sensing based techniques to determine one or more characteristics (e.g., locations, speed or velocity, heading, and/or other characteristics) of target objects. A target object is also referred to herein as a target. As noted above, a sensing node includes a wireless device with a radar or RF sensing system.

For example, the systems and techniques can determine a subset of sensing nodes from available sensing nodes for performing RF sensing to determine one or more characteristics (e.g., location, speed or velocity, heading, and/or other characteristic) of a target. In some aspects, the systems and techniques can further determine a sensing technique (e.g., monostatic, bistatic, and/or multistatic sensing) to be employed by the determined subset of sensing nodes for determining the one or more characteristics of the target. The sensing nodes within a determined subset can be scheduled for transmission of RF signals (e.g., for bistatic or multistatic RF sensing), reception of RF signals (e.g., for bistatic or multistatic RF sensing), or for both transmission and reception of RF signals (e.g., for monostatic RF sensing). In some examples, the techniques can be performed by a network entity, such as a base station (e.g., an evolved Node B (eNB) according to 4G/LTE protocols, a gNodeB (gNB) according to 5G/NR protocols, a WiFi access point (AP) such as a router, range extender or the like according to WiFi 802.11 protocols, etc.), a user device (e.g., a user equipment (UE) device configured to communicate using 5G/NR or 4G/LTE protocols, a station (STA) configured to communicate using Wifi/802.11 protocols, etc.), and/or other device or system. In some aspects, a network entity (or network node) can be implemented in an aggregated or monolithic architecture (e.g., an aggregated or monolithic base station or server architecture), or alternatively, in a disaggregated architecture (e.g., a disaggregated base station or server architecture), and may include one or more of a central unit (CU), a distributed unit (DU), a radio unit (RU), a Near-Real Time (Near-RT) RAN Intelligent Controller (RIC), or a Non-Real Time (Non-RT) RIC.

In some aspects, the systems and techniques can determine the subset of sensing nodes and/or the sensing technique by optimizing a plurality of factors to minimize a metric (e.g., the GDOP or other metric) of the sensing of the target. Minimization of the metric (e.g., GDOP, etc.) for performing the RF sensing technique leads to a reduction in the number of errors and amount of uncertainty in the determination of the one or more characteristics (e.g., location, etc.) of a given target.

In some examples, the plurality of factors may include one or more regions of interest related to the target, self-positioning accuracy of the available sensing nodes, capabilities of the available sensing nodes (e.g., transmit and/or receive functionality, duplexing capabilities, time variance capabilities, antenna capabilities, frequency capabilities, movability capabilities, any combination thereof, and/or other capabilities of the available sensing nodes), a value of the metric (e.g., GDOP or other metric) for different subsets of the available sensing nodes, any combination thereof, and/or other factors. In some cases, the metric (e.g., GDOP) may be determined or calculated for a subset of sensing nodes by utilizing an estimate of the location of the target based on prior knowledge of the target's location. The determined subset of sensing nodes can determine the one or more characteristics of the target by utilizing the determined sensing technique.

Additional details regarding the disclosed systems and techniques for determining communication sensing nodes for RF sensing, as well as specific implementations, are described below.

FIG. 1 is a block diagram illustrating an example of a computing system 170 of an electronic device 107 that may be employed for determining or scheduling sensing nodes for performing RF sensing, in accordance with some examples. The electronic device 107 is an example of a device that can include hardware and software for the purpose of connecting and exchanging data with other devices and systems using a communications network (e.g., a $3^{rd}$ Generation Partnership network, such as a 5th Generation (5G)/New Radio (NR) network, a $4^{th}$ Generation (4G)/Long Term Evolution (LTE) network, a WiFi network, or other communications network). For example, the electronic device 107 can include, or be a part of, a mobile device (e.g., a mobile telephone), a wearable device (e.g., a network-connected or smart watch), an extended reality device (e.g., a virtual reality (VR) device, an augmented reality (AR) device, or a mixed reality (MR) device), a personal computer, a laptop computer, a tablet computer, an Internet-of-Things (IoT) device, a wireless access point, a router, a vehicle or component of a vehicle, a server computer, a robotics device, and/or other device used by a user to communicate over a wireless communications network. In some cases, the device 107 can be referred to as user equipment (UE), such as when referring to a device configured to communicate using 5G/NR, 4G/LTE, or other telecommunication standard. In some cases, the device can be referred to as a station (STA), such as when referring to a device configured to communicate using the Wi-Fi standard.

The computing system 170 includes software and hardware components that can be electrically or communicatively coupled via a bus 189 (or may otherwise be in communication, as appropriate). For example, the computing system 170 includes one or more processors 184. The one or more processors 184 can include one or more CPUs, ASICs, FPGAs, APs, GPUs, VPUs, NSPs, microcontrollers, dedicated hardware, any combination thereof, and/or other processing device/s and/or system/s. The bus 189 can be used by the one or more processors 184 to communicate between cores and/or with the one or more memory devices 186.

The computing system 170 may also include one or more memory devices 186, one or more digital signal processors (DSPs) 182, one or more subscriber identity modules (SIMs) 174, one or more modems 176, one or more wireless transceivers 178, one or more antennas 187, one or more input devices 172 (e.g., a camera, a mouse, a keyboard, a touch sensitive screen, a touch pad, a keypad, a microphone or a microphone array, and/or the like), and one or more output devices 180 (e.g., a display, a speaker, a printer, and/or the like).

The one or more wireless transceivers 178 can receive wireless signals (e.g., signal 188) via antenna 187 from one or more other devices, such as other user devices, network entities or nodes. In some aspects, a network entity (or network node) can be implemented as a base station (e.g., an evolved Node B (eNBs) and/or gNodeB (gNB), location server such as an LMF, WiFi access point (AP) such as a router, range extender or the like, etc.) in an aggregated or monolithic architecture (e.g., an aggregated or monolithic base station or server architecture), or alternatively, in a disaggregated architecture (e.g., a disaggregated base station or server architecture), and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, the one or more wireless transceivers 178 can receive wireless signals (e.g., signal 188) via antenna 187 from a cloud network (e.g., via one or more servers) or other network and/or from other wired or wireless network sources. In some examples, the computing system 170 can include multiple antennas or an antenna array that can facilitate simultaneous transmit and receive functionality. Antenna 187 can be an omnidirectional antenna such that RF signals can be received from and transmitted in all directions. The wireless signal 188 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 178 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 188 into a baseband or intermediate frequency and can convert the RF signals to the digital domain.

In some cases, the computing system 170 can include a coding-decoding device (or CODEC) configured to encode and/or decode data transmitted and/or received using the one or more wireless transceivers 178. In some cases, the computing system 170 can include an encryption-decryption device or component configured to encrypt and/or decrypt data (e.g., according to the Advanced Encryption Standard (AES) and/or Data Encryption Standard (DES) standard) transmitted and/or received by the one or more wireless transceivers 178.

The one or more SIMs 174 can each securely store an international mobile subscriber identity (IMSI) number and related key assigned to the user of the electronic device 107. The IMSI and key can be used to identify and authenticate the subscriber when accessing a network provided by a network service provider or operator associated with the one or more SIMs 174. The one or more modems 176 can modulate one or more signals to encode information for transmission using the one or more wireless transceivers 178. The one or more modems 176 can also demodulate signals received by the one or more wireless transceivers 178 in order to decode the transmitted information. In some examples, the one or more modems 176 can include a WiFi modem, a 4G (or LTE) modem, a 5G (or NR) modem, and/or other types of modems. The one or more modems 176 and the one or more wireless transceivers 178 can be used for communicating data for the one or more SIMs 174.

The computing system 170 can also include (and/or be in communication with) one or more non-transitory machine-readable storage media or storage devices (e.g., one or more memory devices 186), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 186 and executed by the one or more processor(s) 184 and/or the one or more DSPs 182. The computing system 170 can also include software elements (e.g., located within the one or more memory devices 186), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the electronic device 107 can include means for performing operations described herein. The means can include one or more of the components of the computing system 170. For example, the means for performing operations described herein may include one or more of input device(s) 172, SIM(s) 174, modems(s) 176, wireless transceiver(s) 178, output device(s) 180, DSP(s) 182, processors 184, memory device(s) 186, and/or antenna(s) 187.

In some aspects, the electronic device 107 can include means for determining a subset of radio frequency (RF) sensing devices from a plurality of available RF sensing devices for performing an RF sensing technique for a target object, the subset of RF sensing devices being determined based on a plurality of factors associated with the plurality of available RF sensing devices and/or means for transmitting, to at least one RF sensing device of the subset of RF sensing devices, at least one message instructing the subset of RF sensing devices to perform the RF sensing technique for the target object to obtain one or more characteristics of the target object. In some examples, any or all of these means can include the one or more wireless transceivers 178, the one or more modems 176, the one or more processors 184, the one or more DSPs 182, the one or more memory devices 186, any combination thereof, or other component(s) of the electronic device 107.

Figure 2:
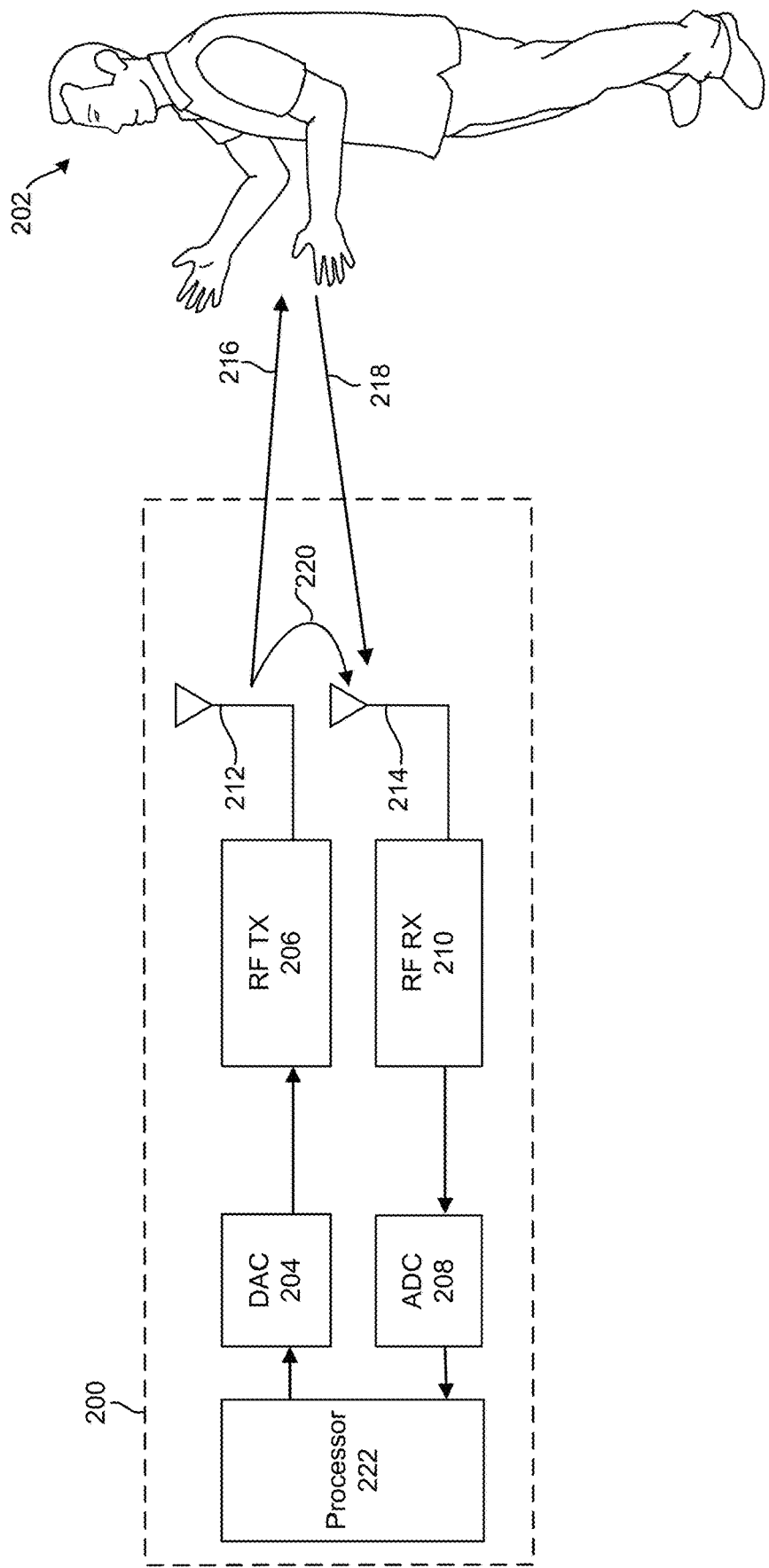
FIG. 2 is a diagram illustrating an example of a wireless device utilizing RF monostatic sensing techniques, which may be employed by the disclosed systems and techniques for scheduling nodes for RF sensing, to determine one or more characteristics of a target object, in accordance with some examples.

FIG. 2 is a diagram illustrating an example of a wireless device 200 utilizing RF monostatic sensing techniques, which may be employed by the disclosed system for determining or scheduling sensing nodes for performing RF sensing to determine one or more characteristics (e.g., location, speed or velocity, heading, etc.) of a target 202 in the form of a person (e.g., a user), in accordance with some examples. In particular, FIG. 2 is a diagram illustrating an example of a wireless device 200 (e.g., a transmit/receive sensing node) that utilizes RF sensing techniques (e.g., monostatic sensing) to perform one or more functions, such as detecting a presence and location of a target 202 (e.g., an object, user, or vehicle), which in this figure is illustrated in the form of a user.

In some examples, the wireless device 200 can be a mobile phone, a tablet computer, a wearable device, a vehicle, an extending reality (XR) device, a computing device or component of a vehicle, or other device (e.g., device 107 of FIG. 1) that includes at least one RF interface. In some examples, the wireless device 200 can be a device that provides connectivity for a user device (e.g., for electronic device 107 of FIG. 1), such as a base station (e.g., a gNB, eNB, etc. or a portion thereof, such as one or more of a CU, a DU, a RU, a Near-RT RIC, or a Non-RT RIC).

In some aspects, wireless device 200 can include one or more components for transmitting an RF signal. The wireless device 200 can include at least one processor 222 for generating a digital signal or waveform. The wireless device 200 can also include a digital-to-analog converter (DAC) 204 that is capable of receiving the digital signal or waveform from the processor(s) 222 (e.g., a microprocessor), and converting the digital signal or waveform to an analog waveform. The analog signal that is the output of the DAC 204 can be provided to RF transmitter 206 for transmission. The RF transmitter 206 can be a Wi-Fi transmitter, a 5G/NR transmitter, a Bluetooth™ transmitter, or any other transmitter capable of transmitting an RF signal.

RF transmitter 206 can be coupled to one or more transmitting antennas such as Tx antenna 212. In some examples, transmit (Tx) antenna 212 can be an omnidirectional antenna that is capable of transmitting an RF signal in all directions. For example, Tx antenna 212 can be an omnidirectional Wi-Fi antenna that can radiate Wi-Fi signals (e.g., 2.4 GHz, 5 GHz, 6 GHz, etc.) in a 360-degree radiation pattern. In another example, Tx antenna 212 can be a directional antenna that transmits an RF signal in a particular direction.

In some examples, wireless device 200 can also include one or more components for receiving an RF signal. For example, the receiver lineup in wireless device 200 can include one or more receiving antennas such as a receive (Rx) antenna 214. In some examples, Rx antenna 214 can be an omnidirectional antenna capable of receiving RF signals from multiple directions. In other examples, Rx antenna 214 can be a directional antenna that is configured to receive signals from a particular direction. In further examples, both the Tx antenna 212 and the Rx antenna 214 can include multiple antennas (e.g., elements) configured as an antenna array.

Wireless device 200 can also include an RF receiver 210 that is coupled to Rx antenna 214. RF receiver 210 can include one or more hardware components for receiving an RF waveform such as a Wi-Fi signal, a Bluetooth™ signal, a 5G/NR signal, or any other RF signal. The output of RF receiver 210 can be coupled to an analog-to-digital converter (ADC) 208. ADC 208 can be configured to convert the received analog RF waveform into a digital waveform. The digital waveform that is the output of the ADC 208 can be provided to the processor(s) 222 for processing. The processor(s) 222 (e.g., a digital signal processor (DSP)) can be configured for processing the digital waveform.

In one example, wireless device 200 can implement RF sensing techniques, for example monostatic sensing techniques, by causing a Tx waveform 216 to be transmitted from Tx antenna 212. Although Tx waveform 216 is illustrated as a single line, in some cases, Tx waveform 216 can be transmitted in all directions by an omnidirectional Tx antenna 212. In one example, Tx waveform 216 can be a Wi-Fi waveform that is transmitted by a Wi-Fi transmitter in wireless device 200. In some cases, Tx waveform 216 can correspond to a Wi-Fi waveform that is transmitted at or near the same time as a Wi-Fi data communication signal or a Wi-Fi control function signal (e.g., a beacon transmission). In some examples, Tx waveform 216 can be transmitted using the same or a similar frequency resource as a Wi-Fi data communication signal or a Wi-Fi control function signal (e.g., a beacon transmission). In some aspects, Tx waveform 216 can correspond to a Wi-Fi waveform that is transmitted separately from a Wi-Fi data communication signal and/or a Wi-Fi control signal (e.g., Tx waveform 216 can be transmitted at different times and/or using a different frequency resource).

In some examples, Tx waveform 216 can correspond to a 5G NR waveform that is transmitted at or near the same time as a 5G NR data communication signal or a 5G NR control function signal. In some examples, Tx waveform 216 can be transmitted using the same or a similar frequency resource as a 5G NR data communication signal or a 5G NR control function signal. In some aspects, Tx waveform 216 can correspond to a 5G NR waveform that is transmitted separately from a 5G NR data communication signal and/or a 5G NR control signal (e.g., Tx waveform 216 can be transmitted at different times and/or using a different frequency resource).

In some aspects, one or more parameters associated with Tx waveform 216 can be modified that may be used to increase or decrease RF sensing resolution. The parameters may include frequency, bandwidth, number of spatial streams, the number of antennas configured to transmit Tx waveform 216, the number of antennas configured to receive a reflected RF signal (e.g., Rx waveform 218) corresponding to Tx waveform 216, the number of spatial links (e.g., number of spatial streams multiplied by number of antennas configured to receive an RF signal), the sampling rate, or any combination thereof. The transmitted waveform (e.g., Tx waveform 216) and the received waveform (e.g., Rx waveform 218) can include one or more RF sensing signals, which are also referred to as radar reference signals (RSs).

In further examples, Tx waveform 216 can be implemented to have a sequence that has perfect or almost perfect autocorrelation properties. For instance, Tx waveform 216 can include single carrier Zadoff sequences or can include symbols that are similar to orthogonal frequency-division multiplexing (OFDM) Long Training Field (LTF) symbols. In some cases, Tx waveform 216 can include a chirp signal, as used, for example, in a Frequency-Modulated Continuous-Wave (FM-CW) radar system. In some configurations, the chirp signal can include a signal in which the signal frequency increases and/or decreases periodically in a linear and/or an exponential manner.

In some aspects, wireless device 200 can implement RF sensing techniques by performing alternating transmit and receive functions (e.g., performing a half-duplex operation). For example, wireless device 200 can alternately enable its RF transmitter 206 to transmit the Tx waveform 216 when the RF receiver 210 is not enabled to receive (i.e. not receiving), and enable its RF receiver 210 to receive the Rx waveform 218 when the RF transmitter 206 is not enabled to transmit (i.e. not transmitting). When the wireless device 200 is performing a half-duplex operation, the wireless device 200 may transmit Tx waveform 216, which may be a radar RS (e.g., sensing signal).

In other aspects, wireless device 200 can implement RF sensing techniques by performing concurrent transmit and receive functions (e.g., performing a sub-band or full-band full-duplex operation). For example, wireless device 200 can enable its RF receiver 210 to receive at or near the same time as it enables RF transmitter 206 to transmit Tx waveform 216. When the wireless device 200 is performing a full-duplex operation (e.g., either sub-band full-duplex or full-band full-duplex), the wireless device 200 may transmit Tx waveform 216, which may be a radar RS (e.g., sensing signal).

In some examples, transmission of a sequence or pattern that is included in Tx waveform 216 can be repeated continuously such that the sequence is transmitted a certain number of times or for a certain duration of time. In some examples, repeating a pattern in the transmission of Tx waveform 216 can be used to avoid missing the reception of any reflected signals if RF receiver 210 is enabled after RF transmitter 206. In one example implementation, Tx waveform 216 can include a sequence having a sequence length L that is transmitted two or more times, which can allow RF receiver 210 to be enabled at a time less than or equal to L in order to receive reflections corresponding to the entire sequence without missing any information.

By implementing alternating or simultaneous transmit and receive functionality (e.g. half-duplex or full-duplex operation), wireless device 200 can receive signals that correspond to Tx waveform 216. For example, wireless device 200 can receive signals that are reflected from objects or people that are within range of Tx waveform 216, such as Rx waveform 218 reflected from target 202. Wireless device 200 can also receive leakage signals (e.g., Tx leakage signal 220) that are coupled directly from Tx antenna 212 to Rx antenna 214 without reflecting from any objects. For example, leakage signals can include signals that are transferred from a transmitter antenna (e.g., Tx antenna 212) on a wireless device to a receive antenna (e.g., Rx antenna 214) on the wireless device without reflecting from any objects. In some cases, Rx waveform 218 can include multiple sequences that correspond to multiple copies of a sequence that are included in Tx waveform 216. In some examples, wireless device 200 can combine the multiple sequences that are received by RF receiver 210 to improve the signal to noise ratio (SNR).

Wireless device 200 can further implement RF sensing techniques by obtaining RF sensing data associated with each of the received signals corresponding to Tx waveform 216. In some examples, the RF sensing data can include channel state information (CSI) data relating to the direct paths (e.g., leakage signal 220) of Tx waveform 216 together with data relating to the reflected paths (e.g., Rx waveform 218) that correspond to Tx waveform 216.

In some aspects, RF sensing data (e.g., CSI data) can include information that can be used to determine the manner in which an RF signal (e.g., Tx waveform 216) propagates from RF transmitter 206 to RF receiver 210. RF sensing data can include data that corresponds to the effects on the transmitted RF signal due to scattering, fading, and/or power decay with distance, or any combination thereof. In some examples, RF sensing data can include imaginary data and real data (e.g., I/Q components) corresponding to each tone in the frequency domain over a particular bandwidth.

In some examples, RF sensing data can be used by the processor(s) 222 to calculate distances and angles of arrival that correspond to reflected waveforms, such as Rx waveform 218. In further examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 202) in the surrounding environment in order to detect target presence/proximity.

The processor(s) 222 of the wireless device 200 can calculate distances and angles of arrival corresponding to reflected waveforms (e.g., the distance and angle of arrival corresponding to Rx waveform 218) by utilizing signal processing, machine learning algorithms, any other suitable technique, or any combination thereof. In other examples, wireless device 200 can transmit or send the RF sensing data to at least one processor of another computing device, such as a server or base station, that can perform the calculations to obtain the distance and angle of arrival corresponding to Rx waveform 218 or other reflected waveforms.

In one example, the distance of Rx waveform 218 can be calculated by measuring the difference in time from reception of the leakage signal to the reception of the reflected signals. For example, wireless device 200 can determine a baseline distance of zero that is based on the difference from the time the wireless device 200 transmits Tx waveform 216 to the time it receives leakage signal 220 (e.g., propagation delay). The processor(s) 222 of the wireless device 200 can then determine a distance associated with Rx waveform 218 based on the difference from the time the wireless device 200 transmits Tx waveform 216 to the time it receives Rx waveform 218 (e.g., time of flight, which is also referred to as round trip time (RTT)), which can then be adjusted according to the propagation delay associated with leakage signal 220. In doing so, the processor(s) 222 of the wireless device 200 can determine the distance traveled by Rx waveform 218 which can be used to determine the presence and movement of a target (e.g., target 202) that caused the reflection.

In further examples, the angle of arrival of Rx waveform 218 can be calculated by the processor(s) 222 by measuring the time difference of arrival of Rx waveform 218 between individual elements of a receive antenna array, such as antenna 214. In some examples, the time difference of arrival can be calculated by measuring the difference in received phase at each element in the receive antenna array.

In some cases, the distance and the angle of arrival of Rx waveform 218 can be used by processor(s) 222 to determine the distance between wireless device 200 and target 202 as well as the position of the target 202 relative to the wireless device 200. The distance and the angle of arrival of Rx waveform 218 can also be used to determine presence, movement, proximity, identity, or any combination thereof, of target 202. For example, the processor(s) 222 of the wireless device 200 can utilize the calculated distance and angle of arrival corresponding to Rx waveform 218 to determine that the target 202 is moving towards wireless device 200.

As noted above, wireless device 200 can include mobile devices (e.g., IoT devices, smartphones, laptops, tablets, etc.) or other types of devices. In some examples, wireless device 200 can be configured to obtain device location data and device orientation data together with the RF sensing data. In some instances, device location data and device orientation data can be used to determine or adjust the distance and angle of arrival of a reflected signal such as Rx waveform 218. For example, wireless device 200 may be set on a table facing the ceiling as a target 202 (e.g., a user) moves towards it during the RF sensing process. In this instance, wireless device 200 can use its location data and orientation data together with the RF sensing data to determine the direction that the target 202 is moving.

In some examples, device position data can be gathered by wireless device 200 using techniques that include RTT measurements, TOA measurements, TDOA measurements, passive positioning, angle of arrival (AoA), received signal strength indicator (RSSI), CSI data, using any other suitable technique, or any combination thereof. In further examples, device orientation data can be obtained from electronic sensors on the wireless device 200, such as a gyroscope, an accelerometer, a compass, a magnetometer, a barometer, any other suitable sensor, or any combination thereof.

Figure 3:
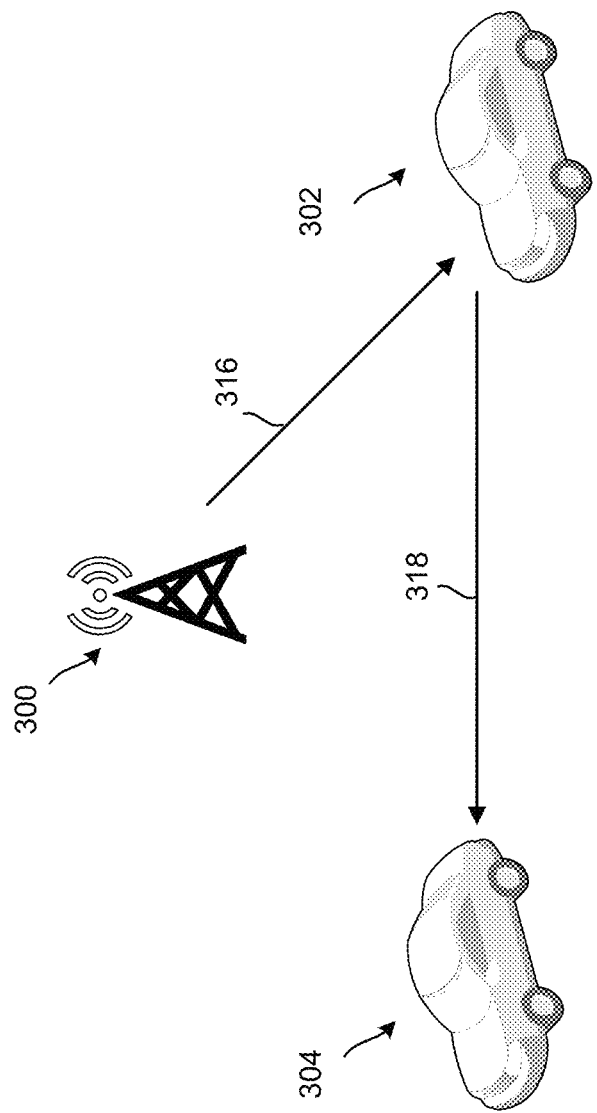
FIG. 3 is a diagram illustrating an example of a receiver utilizing RF bistatic sensing techniques with one transmitter, which may be employed by the disclosed systems and techniques for scheduling nodes for RF sensing, to determine one or more characteristics of a target object, in accordance with some examples.

FIG. 3 is a diagram illustrating an example of a receiver 304, in the form of a vehicle, utilizing RF bistatic sensing techniques with one transmitter 300, which may be employed by the disclosed system for determining or scheduling sensing nodes for performing RF sensing to determine one or more characteristics (e.g., location, speed or velocity, heading, etc.) of a target 302 in the form of a vehicle, in accordance with some examples. For example, the receiver 304 can use the RF bistatic sensing to detect a presence and location of a target 302 (e.g., an object, user, or vehicle), which is illustrated in the form of a vehicle in FIG. 3. In one example, the receiver 304 can include a vehicle configured to communicate using sidelink communication (e.g., according to cellular vehicle-to-everything (C-V2X) protocols according to 4G/LTE and/or 5G/NR, dedicated short-range communications (DSRC) according to 802.11/WiFi, or other vehicle-based communication protocols).

The bistatic radar system of FIG. 3 includes a transmitter 300 (e.g., a transmit sensing node), which in this figure is depicted to be in the form of a network node or entity (e.g., a base station or portion thereof), and a receiver 304 (e.g., a receive sensing node) that are separated by a distance comparable to the expected target distance. As compared to the monostatic system of FIG. 2, the transmitter 300 and the receiver 304 of the bistatic radar system of FIG. 3 are located remote from one another. Conversely, monostatic radar is a radar system (e.g., the system of FIG. 2) comprising a transmitter (e.g., the RF transmitter 206 of wireless device 200 of FIG. 2) and a receiver (e.g., the RF receiver 210 of wireless device 200 of FIG. 2) that are co-located with one another.

An advantage of bistatic radar (or more generally, multistatic radar, which has more than one receiver) over monostatic radar is the ability to collect radar returns reflected from a scene at angles different than that of a transmitted pulse. This can be of interest to some applications (e.g., vehicle applications, scenes with multiple objects, military applications, etc.) where targets may reflect the transmitted energy in many directions (e.g., where targets are specifically designed to reflect in many directions), which can minimize the energy that is reflected back to the transmitter. It should be noted that, in one or more examples, a monostatic system can coexist with a multistatic radar system, such as when the transmitter also has a co-located receiver.

In some examples, the transmitter 300 and/or the receiver 304 of FIG. 3 can be a mobile phone, a tablet computer, a wearable device, a vehicle, or other device (e.g., device 107 of FIG. 1) that includes at least one RF interface. In some examples, the transmitter 300 and/or the receiver 304 can be a device that provides connectivity for a user device (e.g., for IoT device 107 of FIG. 1), such as a base station (e.g., a gNB, eNB, etc. or a portion thereof), a wireless access point (AP), or other device that includes at least one RF interface.

In some aspects, transmitter 300 can include one or more components for transmitting an RF signal. The transmitter 300 can include at least one processor (e.g., the at least one processor 222 of FIG. 2) that is capable of determining signals (e.g., determining the waveforms for the signals) to be transmitted. The transmitter 300 can also include an RF transmitter (e.g., the RF transmitter 206 of FIG. 2) for transmission of a Tx signal comprising Tx waveform 316. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter can be coupled to one or more transmitting antennas, such as a Tx antenna (e.g., the TX antenna 212 of FIG. 2). In some examples, a Tx antenna can be an omnidirectional antenna that is capable of transmitting an RF signal in all directions, or a directional antenna that transmits an RF signal in a particular direction. In some examples, the Tx antenna may include multiple antennas (e.g., elements) configured as an antenna array.

The receiver 304 can include one or more components for receiving an RF signal. For example, the receiver 304 may include one or more receiving antennas, such as an Rx antenna (e.g., the Rx antenna 214 of FIG. 2). In some examples, an Rx antenna can be an omnidirectional antenna capable of receiving RF signals from multiple directions, or a directional antenna that is configured to receive signals from a particular direction. In further examples, the Rx antenna can include multiple antennas (e.g., elements) configured as an antenna array.

The receiver 304 may also include an RF receiver (e.g., RF receiver 210 of FIG. 2) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the at least one processor 222 of FIG. 2). The processor(s) may be configured to process a received waveform (e.g., Rx waveform 318).

In one or more examples, transmitter 300 can implement RF sensing techniques, for example bistatic sensing techniques, by causing a Tx waveform 316 to be transmitted from a Tx antenna. It should be noted that although the Tx waveform 316 is illustrated as a single line, in some cases, the Tx waveform 316 can be transmitted in all directions by an omnidirectional Tx antenna.

In one or more aspects, one or more parameters associated with the Tx waveform 316 may be used to increase or decrease RF sensing resolution. The parameters may include frequency, bandwidth, number of spatial streams, the number of antennas configured to transmit Tx waveform 316, the number of antennas configured to receive a reflected RF signal (e.g., Rx waveform 318) corresponding to the Tx waveform 316, the number of spatial links (e.g., number of spatial streams multiplied by number of antennas configured to receive an RF signal), the sampling rate, or any combination thereof. The transmitted waveform (e.g., Tx waveform 316) and the received waveform (e.g., the Rx waveform 318) can include one or more radar RF sensing signals (also referred to as RF sensing RSs).

During operation, the receiver 304 (e.g., which operates as a receive sensing node) can receive signals that correspond to Tx waveform 216, which is transmitted by the transmitter 300 (e.g., which operates as a transmit sensing node). For example, the receiver 304 can receive signals that are reflected from objects or people that are within range of the Tx waveform 316, such as Rx waveform 318 reflected from target 302. In some cases, the Rx waveform 318 can include multiple sequences that correspond to multiple copies of a sequence that are included in the Tx waveform 316.

In some examples, the receiver 304 may combine the multiple sequences that are received to improve the signal to noise ratio (SNR).

In some examples, RF sensing data can be used by at least one processor within the receiver 304 to calculate distances, angles of arrival, or other characteristics that correspond to reflected waveforms, such as the Rx waveform 318. In other examples, RF sensing data can also be used to detect motion, determine location, detect changes in location or motion patterns, or any combination thereof. In some cases, the distance and angle of arrival of the reflected signals can be used to identify the size, position, movement, and/or orientation of targets (e.g., target 302) in the surrounding environment in order to detect target presence/proximity.

The processor(s) of the receiver 304 can calculate distances and angles of arrival corresponding to reflected waveforms (e.g., the distance and angle of arrival corresponding to the Rx waveform 318) by using signal processing, machine learning algorithms, any other suitable technique, or any combination thereof. In other examples, the receiver 304 can transmit or send the RF sensing data to at least one processor of another computing device, such as a server, that can perform the calculations to obtain the distance and angle of arrival corresponding to the Rx waveform 318 or other reflected waveforms.

In one or more examples, the angle of arrival of the Rx waveform 218 can be calculated by a processor(s) of the receiver 304 by measuring the time difference of arrival of the Rx waveform 318 between individual elements of a receive antenna array of the receiver 304. In some examples, the time difference of arrival can be calculated by measuring the difference in received phase at each element in the receive antenna array.

In some cases, the distance and the angle of arrival of the Rx waveform 318 can be used by the processor(s) of the receiver 304 to determine the distance between the receiver 304 and the target 302 as well as the position of target 302 relative to the receiver 304. The distance and the angle of arrival of the Rx waveform 318 can also be used to determine presence, movement, proximity, identity, or any combination thereof, of the target 302. For example, the processor(s) of the receiver 304 may use the calculated distance and angle of arrival corresponding to the Rx waveform 318 to determine that the target 302 is moving towards the receiver 304.

Figure 4:
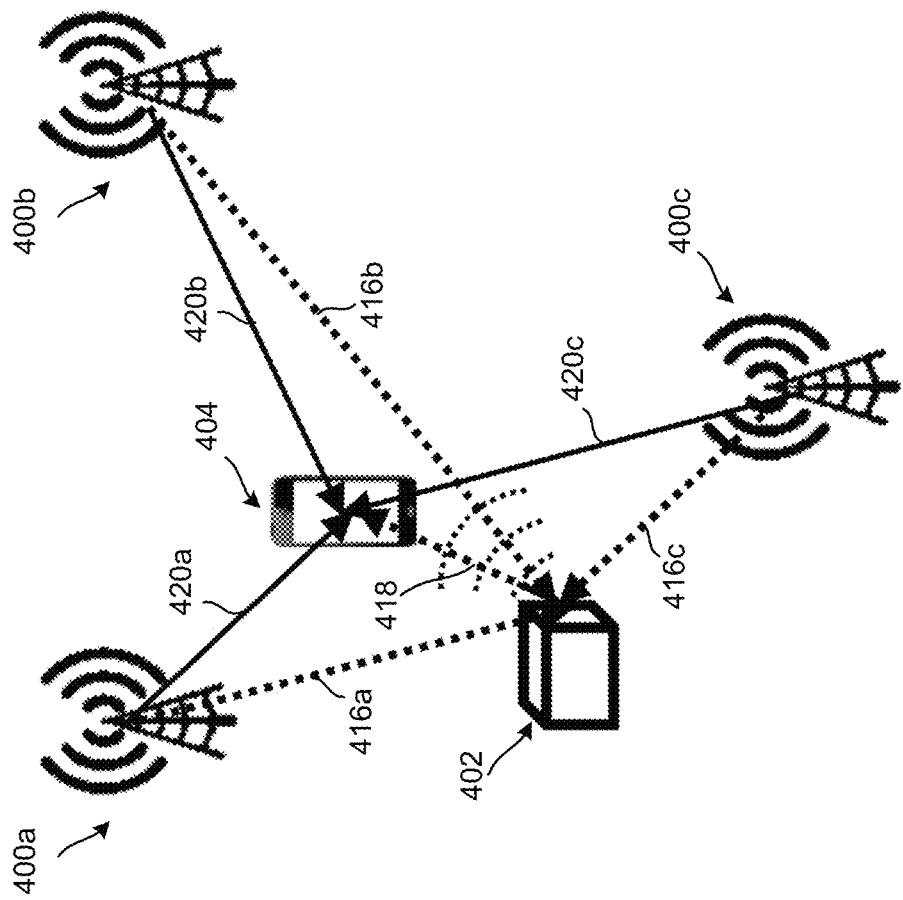
FIG. 4 is a diagram illustrating an example of a receiver utilizing RF bistatic sensing techniques with multiple transmitters, which may be employed by the disclosed systems and techniques for scheduling nodes for RF sensing, to determine one or more characteristics of a target object, in accordance with some examples.

FIG. 4 is a diagram illustrating an example of a receiver 404, in the form of a smart phone, utilizing RF bistatic sensing techniques with multiple transmitters (including a transmitter 400a, a transmitter 400b, and a transmitter 400c), which may be employed by the disclosed system for determining or scheduling sensing nodes for performing RF sensing to determine one or more characteristics (e.g., location, velocity or speed, heading, etc.) of a target 402, in accordance with some examples. For example, the receiver 404 may use RF bistatic sensing to detect a presence and location of a target 402 (e.g., an object, user, or vehicle). The target 402 is depicted in FIG. 4 in the form of an object that does not have communications capabilities (which can be referred to as a device-free object), such as a person, a vehicle (e.g., a vehicle without the ability to transmit and receive messages, such as using C-V2X or DSRC protocols), or other device-free object. The bistatic radar system of FIG. 4 is similar to the bistatic radar system of FIG. 3, except that the bistatic radar system of FIG. 4 has multiple transmitters 400a, 400b, 400c, while the bistatic radar system of FIG. 3 has only one transmitter 300.

The bistatic radar system of FIG. 4 includes multiple transmitters 400a, 400b, 400c (e.g., transmit sensing nodes), which are illustrated to be in the form of network nodes or entities (e.g., base stations, such as eNBs, gNBs, or a portion thereof). The bistatic radar system of FIG. 4 also includes a receiver 404 (e.g., a receive sensing node), which is depicted in the form of a smart phone. The each of the transmitters 400a, 400b, 400c is separated from the receiver 404 by a distance comparable to the expected distance from the target 402. Similar to the bistatic system of FIG. 3, the transmitters 400a, 400b, 400c and the receiver 404 of the bistatic radar system of FIG. 4 are located remote from one another.

In one or more examples, the transmitters 400a, 400b, 400c and/or the receiver 404 may each be a mobile phone, a tablet computer, a wearable device, a vehicle (e.g., a vehicle configured to transmit and receive communications according to C-V2X, DSRC, or other communication protocol), or other device (e.g., device 107 of FIG. 1) that includes at least one RF interface. In some examples, the transmitters 400a, 400b, 400c and/or the receiver 404 may each be a device that provides connectivity for a user device (e.g., for IoT device 107 of FIG. 1), such as a base station (e.g., a gNB, eNB, etc., or a portion thereof), a wireless access point (AP), or other device that includes at least one RF interface.

The transmitters 400a, 400b, 400c may include one or more components for transmitting an RF signal. Each of the transmitters 400a, 400b, 400c may include at least one processor (e.g., the processor(s) 222 of FIG. 2) that is capable of determining signals (e.g., determining the waveforms for the signals) to be transmitted. Each of the transmitters 400a, 400b, 400c can also include an RF transmitter (e.g., the RF transmitter 206 of FIG. 2) for transmission of Tx signals comprising Tx waveforms 416a, 416b, 416c, 420a, 420b, 420c. In one or more examples, Tx waveforms 416a, 416b, 416c are RF sensing signals, and Tx waveforms 420a, 420b, 420c are communications signals. In one or more examples, the Tx waveforms 420a, 420b, 420c are communications signals that may be used for scheduling transmitters (e.g., transmitters 400a, 400b, 400c) and receivers (e.g., receiver 404) for performing RF sensing of a target (e.g., target 402) to obtain location information regarding the target. The RF transmitter can be a transmitter configured to transmit cellular or telecommunication signals (e.g., a transmitter configured to transmit 5G/NR signals, 4G/LTE signals, or other cellular/telecommunication signals, etc.), a Wi-Fi transmitter, a Bluetooth™ transmitter, any combination thereof, or any other transmitter capable of transmitting an RF signal.

The RF transmitter may be coupled to one or more transmitting antennas, such as a Tx antenna (e.g., the TX antenna 212 of FIG. 2). In one or more examples, a Tx antenna can be an omnidirectional antenna that is capable of transmitting an RF signal in all directions, or a directional antenna that transmits an RF signal in a particular direction. The Tx antenna may include multiple antennas (e.g., elements) configured as an antenna array.

The receiver 404 of FIG. 4 may include one or more components for receiving an RF signal. For example, the receiver 404 can include one or more receiving antennas, such as an Rx antenna (e.g., the Rx antenna 214 of FIG. 2). In one or more examples, an Rx antenna can be an omnidirectional antenna capable of receiving RF signals from multiple directions, or a directional antenna that is configured to receive signals from a particular direction. In some examples, the Rx antenna may include multiple antennas (e.g., elements) configured as an antenna array.

The receiver 404 can also include an RF receiver (e.g., RF receiver 210 of FIG. 2) coupled to the Rx antenna. The RF receiver may include one or more hardware components for receiving an RF waveform such as a Wi-Fi signal, a Bluetooth™ signal, a 5G/NR signal, or any other RF signal. The output of the RF receiver can be coupled to at least one processor (e.g., the processor(s) 222 of FIG. 2). The processor(s) may be configured to process a received waveform (e.g., Rx waveform 418, which is a reflection (echo) RF sensing signal).

In some examples, the transmitters 400a, 400b, 400c can implement RF sensing techniques, for example bistatic sensing techniques, by causing Tx waveforms 416a, 416b, 416c (e.g., radar sensing signals) to be transmitted from a Tx antenna associated with each of the transmitters 400a, 400b, 400c. Although the Tx waveforms 416a, 416b, 416c are illustrated as single lines, in some cases, the Tx waveforms 416a, 416b, 416c may be transmitted in all directions (e.g., by an omnidirectional Tx antenna associated with each of the transmitters 400a, 400b, 400c).

In one or more aspects, one or more parameters associated with the Tx waveforms 416a, 416b, 416c may be used to increase or decrease RF sensing resolution. The parameters can include, but are not limited to, frequency, bandwidth, number of spatial streams, the number of antennas configured to transmit Tx waveforms 416a, 416b, 416c, the number of antennas configured to receive a reflected (echo) RF signal (e.g., Rx waveform 418) corresponding to each of the Tx waveforms 416a, 416b, 416c, the number of spatial links (e.g., number of spatial streams multiplied by number of antennas configured to receive an RF signal), the sampling rate, or any combination thereof. The transmitted waveforms (e.g., Tx waveforms 416a, 416b, 416c) and the received waveforms (e.g., the Rx waveform 418) may include one or more radar RF sensing signals (also referred to as RF sensing RSs). It should be noted that although only one reflected sensing signal (e.g., Rx waveform 418) is shown in FIG. 4, it is understood that a separate reflection (echo) sensing signal will be generated by each sensing signal (e.g., Tx waveforms 416a, 416b, 416c) reflecting off of the target 402.

During operation of the system of FIG. 4, the receiver 404 (e.g., which operates as a receive sensing node) can receive signals that correspond to Tx waveforms 416a, 416b, 416c, which are transmitted by the transmitters 400a, 400b, 400c (e.g., which each operate as a transmit sensing node). The receiver 404 can receive signals that are reflected from objects or people that are within range of the Tx waveforms 416a, 416b, 416c, such as Rx waveform 418 reflected from the target 402. In one or more examples, the Rx waveform 418 may include multiple sequences that correspond to multiple copies of a sequence that are included in its corresponding Tx waveform 416a, 416b, 416c. In some examples, the receiver 404 may combine the multiple sequences that are received to improve the signal to noise ratio (SNR).

In some examples, RF sensing data can be used by at least one processor within the receiver 404 to calculate distances, angles of arrival (AOA), time difference of arrival (TDOA) or other characteristics that correspond to reflected waveforms (e.g., Rx waveform 418). In further examples, RF sensing data can also be used to detect motion, determine location, detect changes in location or motion patterns, or any combination thereof. In one or more examples, the distance and angle of arrival of the reflected signals can be used to identify the size, position, movement, and/or orientation of targets (e.g., target 402) in order to detect target presence/proximity.

The processor(s) of the receiver 404 can calculate distances and angles of arrival corresponding to reflected waveforms (e.g., the distance and angle of arrival corresponding to the Rx waveform 418) by using signal processing, machine learning algorithms, any other suitable technique, or any combination thereof. In one or more examples, the receiver 404 can transmit or send the RF sensing data to at least one processor of another computing device, such as a server, that can perform the calculations to obtain the distance and angle of arrival corresponding to the Rx waveform 418 or other reflected waveforms (not shown).

In one or more examples, a processor(s) of the receiver 404 can calculate the angle of arrival of the Rx waveform 418 by measuring the TDOA of the Rx waveform 418 between individual elements of a receive antenna array of the receiver 404. In some examples, the TDOA can be calculated by measuring the difference in received phase at each element in the receive antenna array. In one illustrative example, to determine TDOA, the processor(s) can determine the difference time of arrival of the Rx waveform 418 to the receive antenna array elements, using one of them as a reference. The time difference is proportional to distance differences.

In some cases, the processor(s) of the receiver 404 can use the distance, the AOA, the TDOA, or any combination thereof, of the Rx waveform 418 to determine the distance between the receiver 404 and the target 402, and determine the position of target 402 relative to the receiver 404. In one example, the processor(s) can apply a multilateration or other location-based algorithm using the distance, AOA, and/or TDOA information as input to determine a position (e.g., 3D position) of the target 402. In other examples, the processor(s) can use the distance, the AOA, and/or the TDOA of the Rx waveform 418 to determine a presence, movement (e.g., velocity or speed, heading or direction or movement, etc.), proximity, identity, any combination thereof, or other characteristic of the target 402. For instance, the processor(s) of the receiver 404 may use the distance, the AOA, and/or the TDOA corresponding to the Rx waveform 418 to determine that the target is moving towards the receiver 404.

Figure 5:
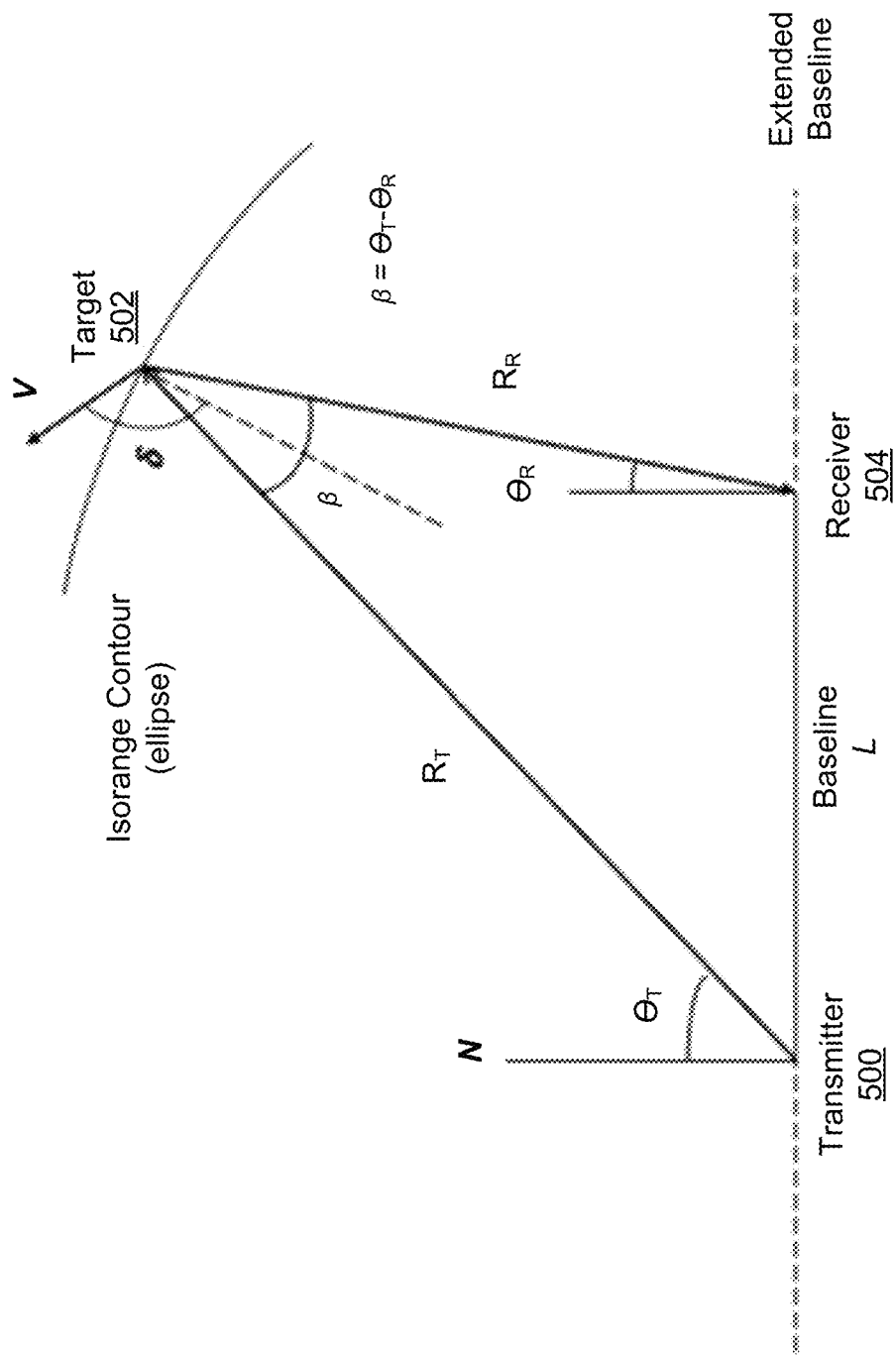
FIG. 5 is a diagram illustrating an example geometry for bistatic (or monostatic) sensing, in accordance with some examples.

FIG. 5 is a diagram illustrating geometry for bistatic (or monostatic) sensing, in accordance with some examples. FIG. 5 shows a bistatic radar North-reference coordinate system in two-dimensions. In particular, FIG. 5 shows a coordinate system and parameters defining bistatic radar operation in a plane (referred to as a bistatic plane) containing a transmitter 500, a receiver 504, and a target 502. A bistatic triangle lies in the bistatic plane. The transmitter 500, the target 502, and the receiver 504 are shown in relation to one another. The transmitter 500 and the receiver 504 are separated by a baseline distance L. The extended baseline is defined as continuing the baseline distance L beyond either the transmitter 500 or the receiver 504. The target 502 and the transmitter 500 are separated by a distance $R_T$, and the target 502 and the receiver 504 are separated by a distance $R_R$.

Angles $\theta_T$ and $\theta_R$ are, respectively, the transmitter 500 and receiver 504 look angles, which are taken as positive when measured clockwise from North (N). The angles $\theta_T$ and $\theta_R$ are also referred to as angles of arrival (AOA) or lines of sight (LOS). A bistatic angle ($\beta$) is the angle subtended between the transmitter 500, the target 502, and the receiver 504 in the radar. In particular, the bistatic angle is the angle between the transmitter 500 and the receiver 504 with the vertex located at the target 502. The bistatic angle is equal to the transmitter 500 look angle minus the receiver 504 look angle $\theta_R$ (e.g., $\beta=\theta_T-\theta_R$).

When the bistatic angle is exactly zero (0), the radar is considered to be a monostatic radar; when the bistatic angle is close to zero, the radar is considered to be pseudo-monostatic; and when the bistatic angle is close to 180 degrees, the radar is considered to be a forward scatter radar. Otherwise, the radar is simply considered to be, and referred to as, a bistatic radar. The bistatic angle ($\beta$) can be used in determining the radar cross section of the target.

Figure 6:
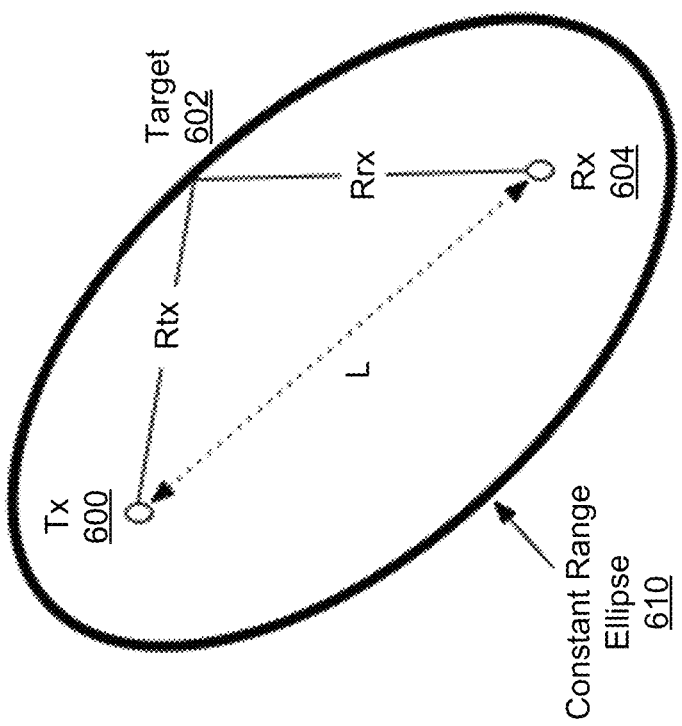
FIG. 6 is a diagram illustrating a bistatic range of bistatic sensing, in accordance with some examples.

FIG. 6 is a diagram illustrating an example of a bistatic range 610 of bistatic sensing, in accordance with some examples. In this figure, a transmitter (Tx) 600, a target 602, and a receiver (Rx) 604 of a radar are shown in relation to one another. The transmitter 600 and the receiver 604 are separated by a baseline distance L, the target 602 and the transmitter 600 are separated by a distance Rtx, and the target 602 and the receiver 604 are separated by a distance Rrx.

Bistatic range 610 (shown as an ellipse) refers to the measurement range made by radar with a separate transmitter 600 and receiver 604 (e.g., the transmitter 600 and the receiver 604 are located remote from one another). The receiver 604 measures the time of arrival from when the signal is transmitted by the transmitter 600 to when the signal is received by the receiver 604 from the transmitter 600 via the target 602. The bistatic range 610 defines an ellipse of constant bistatic range, referred to an iso-range contour, on which the target 602 lies, with foci centered on the transmitter 600 and the receiver 604. If the target 602 is at range Rrx from the receiver 604 and range Rtx from the transmitter 600, and the receiver 604 and the transmitter 600 are located a distance L apart from one another, then the bistatic range is equal to Rrx+Rtx−L. It should be noted that motion of the target 602 causes a rate of change of bistatic range, which results in bistatic Doppler shift.

Generally, constant bistatic range points draw an ellipsoid, with the transmitter 600 and the receiver 604 positions as the focal points. The bistatic iso-range contours are where the ground slices the ellipsoid. When the ground is flat, this intercept forms an ellipse (e.g., bistatic range 610). Note that except when the two platforms have equal altitude, these ellipses are not centered on a specular point.

Figure 7:
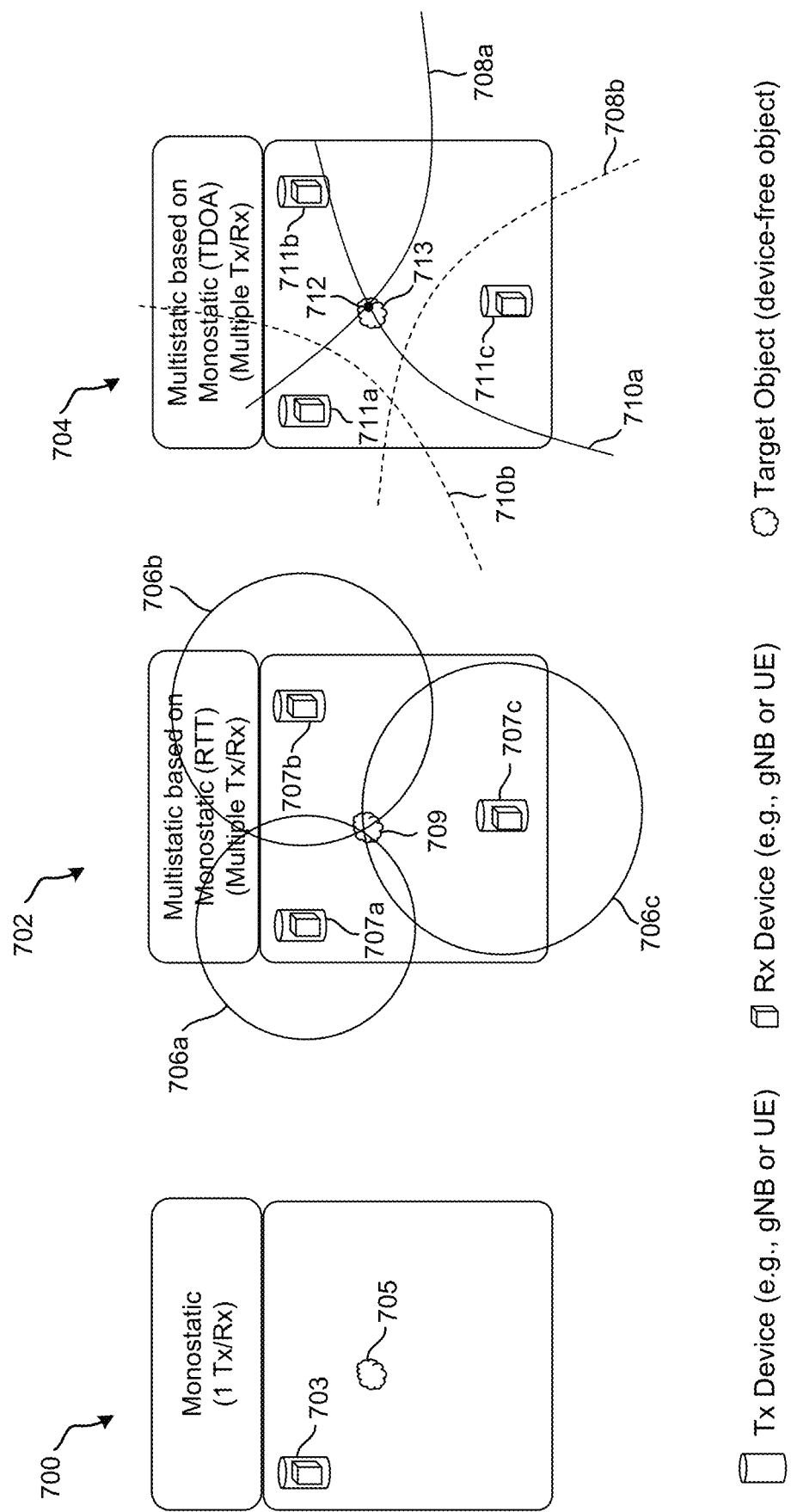
FIG. 7 is a diagram illustrating several example RF sensing techniques, including monostatic sensing and multistatic sensing, that may be employed by the disclosed systems and techniques for scheduling nodes for RF sensing, in accordance with some examples.

FIG. 7 is a diagram illustrating several example RF sensing techniques that may be employed by disclosed system for determining or scheduling sensing nodes for performing RF sensing, in accordance with some examples. In particular, an RTT monostatic sensing technique 700 (e.g., employing only one sensing node), an RTT multistatic sensing technique 702 (e.g., employing multiple sensing nodes), and a TDOA multistatic sensing technique 704 (e.g., utilizing multiple sensing nodes) are shown.

For the RTT monostatic sensing technique 700 of FIG. 7, a single transmit/receive device 703 (e.g., a transmit/receive sensing node), which may be referred to as an anchor node, is performing RF sensing of a target 705 (e.g., a device-free object as shown) by using RTT (e.g., as in 3GPP and WiFi) for determining the location of the target 705. During operation of the RTT monostatic sensing technique 700, the transmit/receive device 703 transmits sensing signals towards the target 705. The sensing signals reflect off of the target 705 to produce reflection sensing signals (also referred to as echo signals or echo). The reflection sensing signals are directed back towards and received by the transmit/receive device 703. At least one processor (e.g., which may be within the transmit/receive device 703) may determine the RTT of the signals resulting from a difference in the time of the transmission of the sensing signals and the time the reflection sensing signals are received. The at least one processor can use the RTT to determine a distance (e.g., a radius of a circle/sphere, which is not shown) from the transmit/receive device 703 to the location of the target 705. The location of the target 705 will be located on a point of the circle/sphere formed by the determined radius.

For the RTT multistatic sensing technique 702 of FIG. 7, three transmit/receive devices 707a, 707b, and 707c (e.g., transmit/receive sensing nodes), which may be referred to as anchor nodes, are shown as performing RF sensing of a target 709 (e.g., a device-free object) by using RTT for determining the location of the target 709. During operation of the RTT multistatic sensing technique 702, the transmit/receive devices 707a, 707b, and 707c each transmit sensing signals towards the target. The sensing signals reflect off of the target 709 to produce reflection (echo) sensing signals, which are directed back towards and received by each of the transmit/receive devices 707a, 707b, and 707c. At least one processor (e.g., which may be within one or more of the transmit/receive devices 707a, 707b, and 707c) determines a respective RTT resulting from a difference in the time of the transmission of each of the sensing signals and the time the reflection sensing signals are received by the at least one processor. The at least processor can use the RTTs to determine a distance (e.g., a radius of a circle/sphere, which is not shown) from each transmit/receive device 707a, 707b, and 707c to the location of the target 709. As illustrated in FIG. 7, a circle 706a for transmit/receive device 707a, a circle 706b for transmit/receive device 707b, and a circle 706c for transmit/receive device 707c are formed by the determined distances (e.g., the radii). The at least one processor can determine a location of the target 709 at a point where the three circles 706a, 706b, 706c intersect.

For the TDOA multistatic sensing technique 704 of FIG. 7, multiple (e.g., 3) transmit/receive devices 711a, 711b, and 711c (e.g., transmit/receive sensing nodes), which may be referred to as anchor nodes, are shown as performing RF sensing of a target 713 by using TDOA (e.g., as in 4G/LTE and/or 5G/NR) for determining the location of the target 713 (e.g., a device-free object). During operation of the TDOA multistatic sensing technique 704, one of the transmit/receive devices 711a, 711b, or 711c may operate as a transmitter, while the remaining two transmit/receive devices 711a, 711b, and/or 711c may each operate as a receiver. The transmit/receive device operating as a transmitter will transmit sensing signals towards the target 713. The sensing signals will reflect off of the target 713 to produce reflection (echo) sensing signals, which are directed towards and received by the two transmit/receive devices operating as receivers. At least one processor (e.g., which may be within at least one of transmit/receive devices 711a, 711b, and 711c) calculates the RTT (e.g., resulting from a difference in the time of the transmission of the sensing signals and the time the reflection sensing signals are received by the at least one processor) for each of the two transmit/receive devices operating as receivers. In such an example, the at least one processor will generate two separate round trip times (RTTs). The at least one processor determines the difference between the two RTTs. The at least one processor may generate a pair of hyperbolas for the two transmit/receive devices operating as receivers based on the difference between the RTTs. For example, one pair of hyperbolas 708a, 708b is generated based on signals transmitted by the transmit/receive device 711a and received by the transmit/receive device 711c, and another pair of hyperbolas 710a, 710b is generated based on signals transmitted by the transmit/receive device 711b and received by the transmit/receive device 711c. After multiples pairs of hyperbolas have been generated, the at least one processor can determine a location of the target 713 based on an intersection between a pair of hyperbolas (e.g., an intersection point 712 between the hyperbola 708a and the hyperbola 710a).

Figure 8:
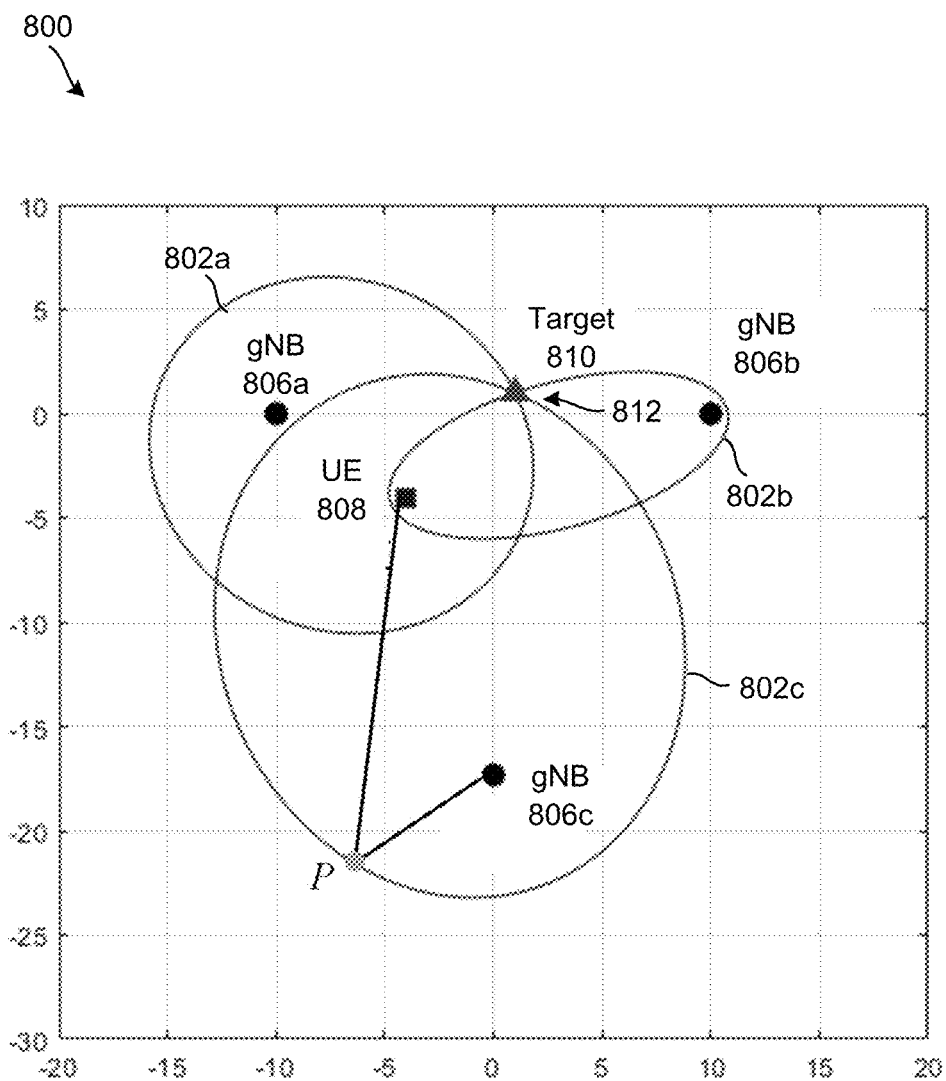
FIG. 8 is a graph illustrating an example of bistatic RF sensing utilizing time of arrival (TOA) to determine a location of a target object, which may be employed by disclosed systems and techniques for scheduling nodes for RF sensing to detect a target object, in accordance with some examples.

FIG. 8 is a graph 800 illustrating an example of bistatic sensing utilizing TOA to determine a location of a target 810 (e.g., a device-free object), which may be employed by disclosed system for determining or scheduling sensing nodes for RF sensing in accordance with some examples. As shown, three transmit devices 806a, 806b, and 806c (e.g., transmit sensing nodes in the form of gNBs) and a receive device 808 (e.g., a receive sensing node in the form of a UE) are performing RF sensing of the target 810 by using TOA for determining the location of the target 810. The transmit devices 806a, 806b, and 806c and the receive device 808 can each be referred to as an anchor node.

During operation, the transmit devices 806a, 806b, and 806c each transmit sensing signals towards the target 810. The sensing signals reflect off of the target 810 to produce reflection (echo) sensing signals, which are directed back towards and received by the receive device 808. At least one processor (e.g., which may be within one or more of the transmit devices 806a, 806b, and 806c and/or the receive device 808) determines a TOA resulting from a difference in the time of the transmission of the sensing signals by the transmit devices 806a, 806b, and 806c and the time the reflection sensing signals are received by the receive device 808. The at least one processor can use the TOA to determine an ellipse 802a, an ellipse 802b, and an ellipse 802c respectively associated with each of the transmit devices 806a, 806b, and 806c (e.g., ellipse 802a is associated with transmit device 806a, ellipse 802b is associated with transmit device 806b, and ellipse 802c is associated with transmit device 806c). The two anchor nodes within each ellipse 802a, 802b, 802c are the foci of the respective ellipse 802a, 802b, and 802c. For example, the transmit device 806b and the receive device 808 are the foci of ellipse 802b. It should be noted that for each ellipse 802a, 802b, 802c, the sum of the distance from each of the two foci to a point (e.g., p) located on a given ellipse will be the same for all points on the ellipse. The at least one processor can determine a location of the target 810 at an intersection point 812 of the ellipses 802a, 802b, 802c.

Figure 9:
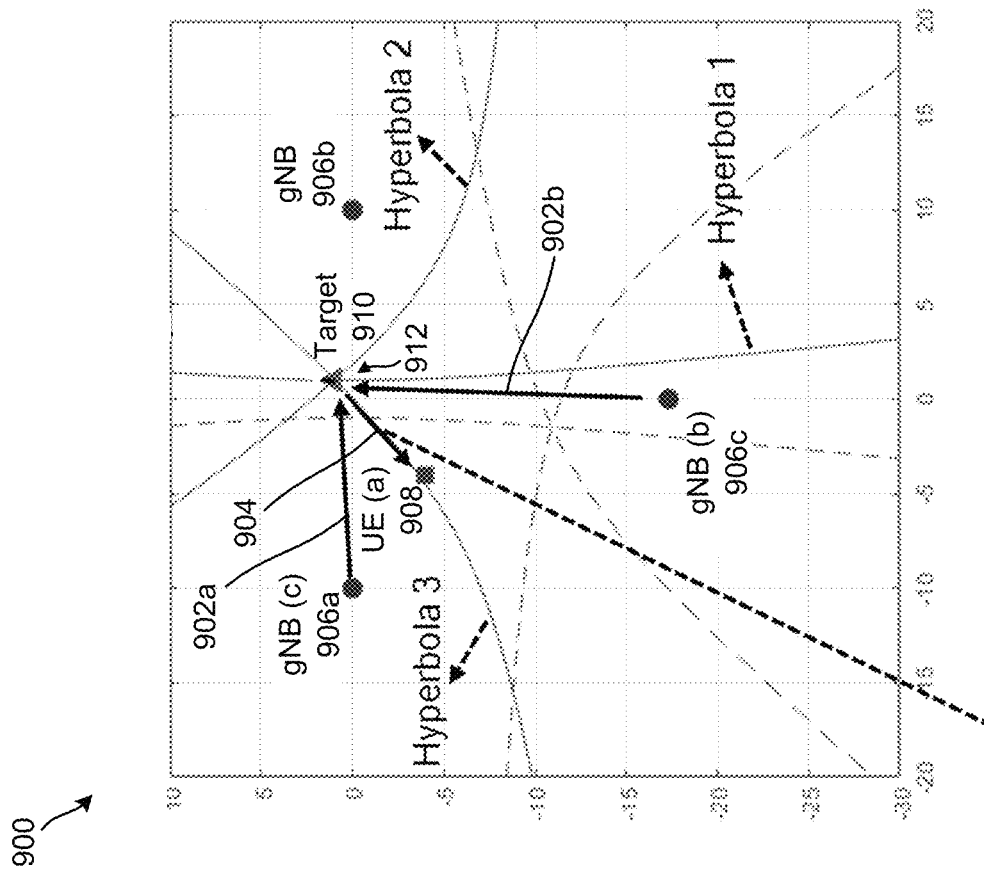
FIG. 9 is a graph illustrating an example of bistatic RF sensing utilizing time difference of arrival (TDOA) to determine a location of a target object, which may be employed by disclosed systems and techniques for scheduling nodes for RF sensing to detect a target object, in accordance with some examples.

FIG. 9 is a graph 900 illustrating an example of multiple bistatic sensing utilizing TDOA to determine a location of a target 910 (e.g., a device-free object), which may be employed by disclosed system for determining or scheduling sensing nodes for RF sensing, in accordance with some examples. As shown, three transmit devices 906a, 906b, and 906c (e.g., transmit sensing nodes in the form of gNBs) and a receive device 908 (e.g., a receive sensing node in the form of a UE) are performing RF sensing of the target 910 by using TDOA for determining the location of the target 910. In FIG. 9, the receive device 908 is denoted as anchor node (a), the transmit device 906c is denoted as anchor node (b), and the transmit device 906a is denoted as anchor node (c).

During operation, one of the transmit devices (e.g., transmit device 906a as anchor node (c)) will transmit sensing signals (e.g., sensing signal 902a) towards the target 910. The sensing signals will reflect off of the target 910 to produce reflection (echo) sensing signals (e.g., reflection sensing signals 904), which are directed towards and received by the receive device 908 (e.g., as the anchor node (a)). Also during operation, another one of the transmit devices (e.g., transmit device 906c as anchor node (b)) will transmit sensing signals (e.g., sensing signal 902b) towards the target. The sensing signals will reflect off of the target to produce reflection (echo) sensing signals (e.g., reflection sensing signals 904), which are directed towards and received by the receive device 908 (e.g., as the anchor node (a)). It should be noted that although only one line denoting the reflection sensing signals 904 is shown in FIG. 9, it is understood that separate reflection (echo) sensing signals will be generated by each set of sensing signals (e.g., sensing signals 902a and sensing signals 902b) reflecting off of the target.

At least one processor (e.g., which may be within at least one of the transmit and/or receive devices) calculates the RTT (e.g., resulting from a difference in the time of the transmission of the sensing signals and the time the reflection sensing signals are received) for each of the two transmit devices 906a (anchor device (c)) and 906c (anchor device (b)), resulting in the generation of two separate RTTs. The at least one processor determines the difference between the two RTTs. A pair of hyperbolas for the two transmit devices is generated based on the difference between the RTTs. For example, one pair of hyperbolas (e.g., comprising hyperbola 1) is generated for the transmit device 906a, and another pair of hyperbolas (e.g., comprising hyperbola 3) is generated for the transmit device 906c.

It is noted that since anchor node pairs (a,b) and (a,c) have a common anchor node (a) (receive device 908), computing the difference of their measurements removes the common anchor node (e.g., anchor node (a)), and obtains the difference between the distances between the target 910 and the anchor nodes (b) (transmit device 906c) and (c) (transmit device 906a), thus localizing the target 910 on a hyperbola with anchor node (b) and anchor node (c) as the foci. As such, the position of the target 910 can be determined as the intersection of the hyperbolas (e.g., shown in FIG. 9 as intersection point 912 between hyperbola 1, hyperbola 2, and hyperbola 3).

Figure 10:
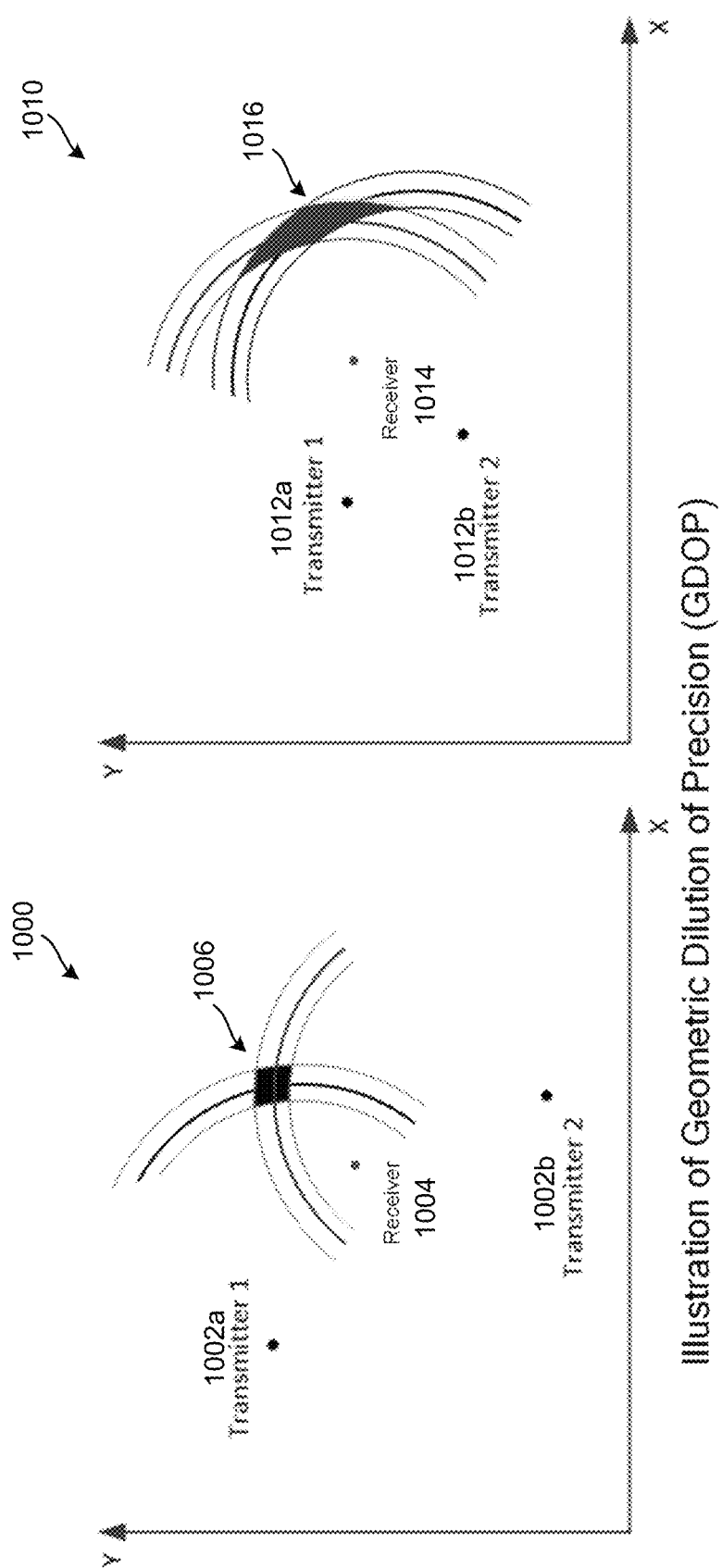
FIG. 10 depicts two graphs showing example geometric dilution of precision (GDOP) distribution areas for sensing scenarios with transmitters in different locations with respect to a target object, in accordance with some examples.

FIG. 10 depicts a first graph 1000 (in the time or distance domain) showing an example GDOP distribution area 1006 and a second graph 1010 (in the time or distance domain) showing an example GDOP distribution area 1016. The GDOP distribution areas 1006 and 1016 of graphs 1000 and 1010, respectively, are for sensing scenarios with transmitters 1002a, 1002b, 1012a, 1012b in different locations with respect to a target (not shown but located within the GDOP distribution areas 1006, 1016). As noted above, the GDOP is a measure of sensitivity of a location accuracy of the target with respect to errors and/or noise in the sensing measurements taken during the sensing for the target. The amount of GDOP depends upon both the locations of the anchor nodes (e.g., the transmitters 1002a, 1002b, 1012a, 1012b and the receivers 1004, 1014) with respect to the location of the target as well as the specific algorithm (e.g., employing monostatic sensing, bistatic sensing, and/or multistatic sensing utilizing RTT, TOA, and/or TDOA measurements) used to compute the location of the target.

For example, for performing RF sensing to detect a location or other characteristic of a target utilizing TDOA and/or RTT measurements, distributing the anchor nodes at disparate positions relative to one another and relative to the target achieves better GDOP (e.g., a smaller GDOP distribution area) than having the anchor nodes located only on one side of the target. When the anchor nodes are distributed at different positions relative to each other and the target, sensing measurements for the target can be obtained from very different directions, which leads to a better GDOP in performing the RF sensing of the target. For example, in graph 1000, the transmitters 1002*a*, 1002*b* and the receiver 1004 are located at positions relative to the target such that $$G = \begin{array}{ccc} \frac{(x-x_1)}{\sqrt{(x-x_1)^2+(y-y_1)^2}} & \frac{(y-y_1)}{\sqrt{(x-x_1)^2+(y-y_1)^2}} & \frac{(z-z_1)}{\sqrt{(x-x_1)^2+(y-y_1)^2}} \\ \frac{(x-x_2)}{\sqrt{(x-x_2)^2+(y-y_2)^2}} & \frac{(y-y_2)}{\sqrt{(x-x_2)^2+(y-y_2)^2}} & \frac{(z-z_2)}{\sqrt{(x-x_2)^2+(y-y_2)^2}} \\ \vdots & \vdots & \vdots \\ \frac{(x-x_N)}{\sqrt{(x-x_N)^2+(y-y_N)^2}} & \frac{(y-y_N)}{\sqrt{(x-x_N)^2+(y-y_N)^2}} & \frac{(z-z_N)}{\sqrt{(x-x_N)^2+(y-y_N)^2}} \end{array}$$

they can obtain measurements from very different directions and angles. Conversely, in graph 1010, the transmitters 1012*a*, 1012*b* and the receiver 1014 are located at positions relative to the target that closer to one another as compared to graph 1000, such that the measurements obtained by the transmitters 1012*a*, 1012*b* and the receiver 1014 are from more similar directions. As such, the GDOP of the setup sensing setup of graph 1000 is much better (e.g., as evidenced by the smaller GDOP distribution area 1006) than the GDOP of the RF sensing setup of graph 1010 (e.g., as evidenced by a larger GDOP distribution area 1016 as compared to the GDOP distribution area 1006 of graph 1000). One illustrative characterization of this observation is that the GDOP is better (e.g., has a smaller GDOP distribution area) when the GDOP distribution area is located within a convex-hull formed by the locations of the anchor nodes, than when at least a portion of the GDOP distribution area is located outside of the convex-hull.

Figure 11:
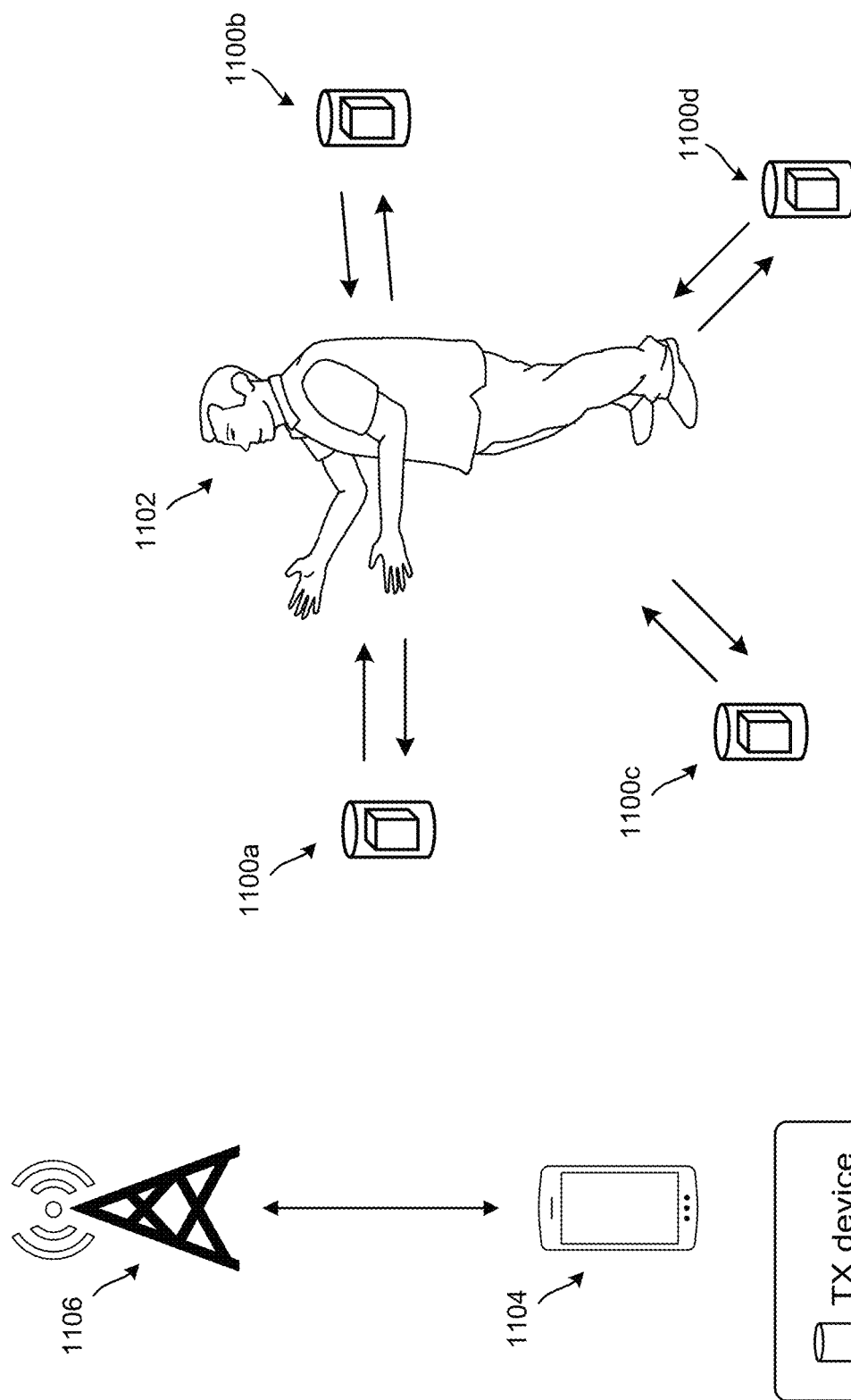
FIG. 11 is a diagram illustrating an example of a system for scheduling nodes for RF sensing to locate a target object, in accordance with some examples.

As noted above, in RF sensing systems, the geometry of the anchor nodes (e.g., the transmitters 1002*a*, 1002*b*, 1012*a*, 1012*b* and the receivers 1004, 1014) influences the GDOP, which is related to the precision or accuracy of determining the position or location of a target object. The GDOP may be calculated in any suitable manner based on the type of positioning method used (e.g., RTT, TOA, or TDOA based positioning). For example, the GDOP may be the ratio of the standard deviation (σ) of errors in a least squares solution (e.g., the square root of the sum of the squared standard deviation of error along the horizontal or x axis and the squared standard deviation of error along the vertical or y axis) to a standard deviation of the sensing measurement errors (e.g., across the cartesian coordinate system). In one illustrative example, for two-dimensional sensing systems (e.g., as depicted in graphs 1000 and 1010), the GDOP may be computed by the following GDOP formula:

$$GDOP = \frac{\sqrt{\sigma_x^2 + \sigma_y^2 + \sigma_z^2}}{\sigma_{meas}} = \frac{\sqrt{\text{trace}\{(G^T G)^{-1}\}}}{\sigma_{meas}}$$

where $$\sqrt{\sigma_x^2 + \sigma_y^2 + \sigma_z^2}$$

characterizes the location error, and $\sigma_{meas}^2$ is the measurement error variance. The matrix G is dependent upon the type of sensing measurements (e.g., RTT, TOA, or TDOA measurements) that are used for the sensing of the target. For example, when a TOA sensing method is used for sensing the target, the matrix G may be provided by the following formula:

As noted above, systems and techniques are described herein for determining or scheduling communication sensing nodes (e.g., transmit and/or receive sensing nodes) for performing RF sensing to determine one or more characteristics (e.g., locations, speed or velocity, heading, and/or other characteristics) of target objects. FIG. 11 is a diagram illustrating a system for determining or scheduling sensing nodes for RF sensing to locate a target 1102, in accordance with some examples. In the example of FIG. 11, the target 1102 is a person. The system of FIG. 11 is shown to include a transmit/receive node 1104 in the form of a UE (e.g., a mobile device such as a smartphone), a transmit/receive node 1106 in the form of a network entity (e.g., a location management function (LMF) or base station such as an eNB or gNB or a portion thereof), a target 1102 (e.g., a device-free object), as well as a plurality of transmit/receive nodes 1100*a*, 1100*b*, 1100*c*, 1100*d*. The transmit/receive nodes 1100*a*, 1100*b*, 1100*c*, 1100*d* can include any wireless communications device, such as a user device (e.g., a UE, STA, vehicle, etc.), a base station (e.g., gNB, AP, etc.), or other device. As noted above, a network entity (or network node) may be implemented as a base station (e.g., an eNBs, gNB, location server such as an LMF, a WiFi AP, etc.) in an aggregated or monolithic architecture (e.g., an aggregated or monolithic base station or server architecture), or alternatively, in a disaggregated architecture (e.g., a disaggregated base station or server architecture), and may include one or more of a CU, a DU, a RU, a Near-RT RIC, or a Non-RT RIC.

The devices or nodes (e.g., transmit/receive nodes 1100*a*, 1100*b*, 1100*c*, 1100*d*, 1104, and 1106) illustrated in the system of FIG. 11 may take on various different roles of operation during the RF sensing operations. In one illustrative example, the transmit/receive node 1104 may take on the role of a requesting node as well as the role of a location computation node, the transmit/receive node 1106 may take on the role of a scheduling node as well as a coordinating node, and the transmit/receive nodes 1100*a*, 1100*b*, 1100*c*, 1100*d* are available sensing nodes (and can be referred to as transmit/receive sensing nodes). As described herein, the function of a requesting node may be to request (from the scheduling node) an RF sensing operation to obtain one or more characteristics (e.g., a location, speed or velocity, heading, etc.) of the target. The function of a location computation node may be to receive or collect sensing measurements from RF sensing of the target and calculating the one or more characteristics of the target using the sensing measurements. The function of the scheduling node may be to determine a particular subset of sensing nodes from available sensing nodes and in some cases to determine a specific RF sensing technique to use for performing RF sensing of a target. In some case, the function of the coordinating node may be to receive, gather, and/or process the capabilities of the available sensing nodes.

During operation of the system, the transmit/receive node 1104 may want to obtain a location of the target 1102, in which case the transmit/receive node 1104 may operate as a requesting node. When the transmit/receive node 1104 is operating as a requesting node, the transmit/receive node 1104 may send a request to the transmit/receive node 1106 (operating as a scheduling node) to initiate or otherwise cause an RF sensing operation to be performed. For instance, the transmit/receive node 1104 can request RF sensing to obtain one or more characteristics of the target 1102 (or any target within a given environment), such as a location or position of the target 1102, a speed or velocity of the target 1102, a heading of the target 1102, any combination thereof, and/or other characteristic of the target 1102. While in FIG. 11, the transmit/receive node 1104 is shown in the form of a mobile device, any other device can act as a requesting node, such as a vehicle, an XR device, a desktop computer, etc. Further, while in FIG. 11 the transmit/receive node 1106 is shown in the form of a network entity (e.g., a location management function (LMF) or base station (e.g., gNB)), other wireless communication devices or network entities can perform the operations of the scheduling node.

The transmit/receive node 1106, operating as a scheduling node, receives the request and determines a subset of sensing nodes of the available sensing nodes (e.g., transmit/receive sensing nodes 1100a, 1100b, 1100c, 1100d). In some cases, the transmit/receive node 1106, as the scheduling node, can also determine a sensing technique that is to be used by the chosen subset of sensing nodes to perform the RF sensing of the target 1102 to obtain the one or more characteristics (e.g., location, velocity, etc.) of the target 1102. For instance, the transmit-receive node 1106 can determine that one or more of monostatic sensing, bistatic sensing, and/or multistatic sensing using RTT, TOA, and/or TDOA sensing measurements will be performed for the RF sensing requested by the transmit/receive node 1104.

To select the subset of sensing nodes for performing the RF sensing, the transmit/receive node 1106, operating as a scheduling node, may optimize a plurality of factors to minimize the GDOP of the sensing of the target 1102. In some cases, the transmit/receive node 1106 (as the scheduling node) may optimize the factors to minimize the GDOP by running or executing an optimizer on at least one processor (e.g., processor(s) 222 of FIG. 2), which may be located on the scheduling node (transmit/receive node 1106 in this example). The plurality of factors may include one or more regions of interest related to the target 1102, the self-positioning accuracy of each of the available sensing nodes (e.g., transmit/receive sensing nodes 1100a, 1100b, 1100c, 1100d), the capabilities of each of the available sensing nodes (e.g., transmit/receive sensing nodes 1100a, 1100b, 1100c, 1100d), the GDOP of different subsets of sensing nodes of the available sensing nodes for the sensing of the target 1102, any combination thereof, and/or other factors. The various factors are described in more detail below.

After the transmit/receive node 1106, operating as a scheduling node, determines the specific subset of sensing nodes of the available sensing nodes (e.g., transmit/receive sensing nodes 1100a, 1100b, 1100c, 1100d) and the specific sensing technique to use for the sensing of the target 1102, the transmit/receive node 1106, operating as a scheduling node, commands the specific sensing nodes in the chosen subset of sensing nodes to perform RF sensing of the target 1102 by using the chosen sensing technique to obtain the location of the target 1102. For instance, the transmit/receive node 1106 may transmit signaling with information instructing the specific sensing nodes in the subset to perform RF sensing of the target 1102. After the sensing nodes in the chosen subset of sensing nodes receive the command, the sensing nodes in the chosen subset of sensing nodes perform the RF sensing operations of the target 1102 using the chosen sensing technique to obtain sensing measurements. The transmit/receive node 1104, operating as a location computation node, collects the sensing measurements from the sensing of the target 1102 and determines or calculates the one or more characteristics (e.g., the location, velocity, heading, etc.) of the target using the sensing measurements.

As described above, in some examples, the function of the requesting node may be to request sensing (from the scheduling node) to obtain the location of the target 1102. As further noted above, the function of the coordinating node may be to gather the capabilities of the available sensing nodes. The functions of the scheduling node may be to determine or schedule a subset of sensing nodes from the available sensing nodes for transmit/receive sensing of the target 1102 (e.g., choosing a specific subset of sensing nodes of the available sensing nodes and choosing a specific sensing technique for the sensing). The scheduling node can further determine and indicate one or more regions of interest related to the target 1102, calculate the GDOP for different subsets of sensing nodes of the available sensing nodes, store previous sensing measurements of the target 1102, and/or command (e.g., by transmitting signaling with instructions) the chosen subset of sensing nodes to sense the target 1102 by using the chosen sensing technique to obtain the one or more characteristics (e.g., the location, velocity, heading, etc.) of the target 1102. The functions of the location computation node may be to collect the sensing measurements from the sensing of the target 1102 by the chosen subset of sensing nodes and to determines or calculates the one or more characteristics (e.g., the location, velocity, heading, etc.) of the target 1102 using the sensing measurements.

In some aspects, the transmit/receive node 1106, when operating as a scheduling node, may determine region(s) of interest that is/are related to the target 1102. In some examples, the requesting node (e.g., the transmit/receive node 1104) can indicate the region(s) of interest to the transmit/receive node 1106 (as the scheduling node). In some cases, the transmit/receive node 1106, operating as the scheduling node, can determine the region(s) of interest by referring to previous sensing measurements of the target (e.g., which may be stored within the scheduling node) in relation to the location of the target 1102. In one or more examples, the region(s) of interest may be identified (e.g., by the requesting node) by two-dimensional (2D) coordinates (e.g., latitude and longitude) and/or by three-dimensional (3D) coordinates (e.g., latitude, longitude, and altitude). The transmit/receive node 1106, when operating as a scheduling node, may determine the available sensing nodes, which are located within the identified region(s) of interest related to the target 1102.

In some aspects, the transmit/receive node 1106, when operating as a coordinating node (in addition to operating as the scheduling node as described above), may receive or determine capabilities (and in some cases the self-positioning accuracy, described below) of each of the available sensing nodes (e.g., transmit/receive sensing nodes 1100a, 1100b, 1100c, 1100d). In some examples, requests for capabilities and/or information detailing the capabilities of the available sensing nodes may be included in one or more capabilities messages exchanged between the devices (e.g., the transmit/receive sensing nodes 1100a, 1100b, 1100c, 1100d and one or both of the transmit/receive nodes 1104 and 1106) of the system. For example, the transmit/receive node 1104 (as the requesting node) or the transmit/receive node 1104 (as the scheduling node) may transmit a request for capabilities to the transmit/receive sensing nodes 1100a, 1100b, 1100c, 1100d using an LTE positioning protocol (LPP) RequestCapabilities Message or in similar message using New Radio Positioning Protocol A (NRPPa). The transmit/receive sensing nodes 1100a, 1100b, 1100c, 1100d can respond with the capability information using LPP ProvideCapabilities messages or in similar messages using NRPPa. In some examples, the capabilities messages may be transmitted using an F1 interface (e.g., in 5G, in the case where the gNB is a sensing node), universal mobile telecommunications system air interface (Uu), and/or sidelink (SL) radio resource control (RRC) messaging.

In some examples, a coordinating node may be an LMF in a radio access network (RAN) (e.g., which may be co-located at a gNB) or an LMF in a UE (e.g., for sidelink out-of-coverage (SL OOC) cases). In some examples, a scheduling node, a location computation node, and/or a node that operates as both a scheduling node and a location computation node may also operate as the coordinating node to determine or receive the capabilities.

In one or more examples, the capabilities of the available sensing nodes may include transmit/receive functionality, duplexing capabilities (e.g., whether a particular sensing node can perform duplex communications), time variance of the capabilities, different capabilities for transmitting and receiving sensing signals, antenna capabilities, frequency capabilities, movability capabilities, any combination thereof, and/or other capabilities.

In some cases, the transmit/receive functionality of the capabilities of an available sensing node is related to whether the sensing node has the ability to only transmit sensing signals, only receive sensing signals, or both transmit and receive sensing signals. In some examples, the duplexing capabilities is related to whether the available sensing node can perform a half-duplex operation, a sub-band full-duplex operation, and/or a full-band full-duplex operation. For example, an available sensing node with a transmit/receive functionality may perform a half-duplex operation, a sub-band full-duplex operation (e.g., frequency division duplexing (FDD)), or a full-band full-duplex operation. In another example, if an available sensing node can only perform a half-duplex operation or a sub-band full-duplex operation, that available sensing node may be configured to only transmit sensing signals or only receive sensing signals at a given point in time.

The time variance of the capabilities may be related to whether capabilities of the available sensing node vary with time, either semi-statically or dynamically. For example, for dynamic variance of capabilities, full-duplex operation may only be supported for certain transmit/receive pairs of or antenna beams of available sensing nodes, but not for other pairs of available sensing nodes or for other antenna beams of the available sensing nodes. Also for dynamic variance of capabilities, for example, an available sensing node may perform both bistatic and monostatic sensing, if the available sensing node is capable of supporting full-duplex operation for the antenna beam that is to be used for the sensing. For semi-static variance of capabilities, for example, if an available sensing node has a low battery, the available sensing node may be configured to only transmit sensing signals or to only receive sensing signals, depending upon whether the transmit or receive function requires less power, rather than configured to both transmit and receive sensing signals.

The different capabilities for transmitting and receiving sensing signals of an available sensing node may be related to the number of antennas the available sensing node has for transmitting the sensing signals and the number of antennas for receiving the sensing signals. For example, if an available sensing node has a larger number of antennas (e.g., 256 antennas) for transmitting the sensing signals than the number of antennas (e.g., four antennas) for receiving the sensing signals, the available sensing node may be configured to only transmit sensing signals, as the transmission with the large number of antennas will produce a sharp transmission antenna beam with a high array gain, which is optimal for sensing. In one or more examples, the different capabilities for transmitting and receiving sensing signals of an available sensing node may be related to the number of antenna beams, the frequency range and aggregation, and/or the power the available sensing node has for transmitting the sensing signals; and to the number of antenna beams, the frequency range and aggregation, and/or the power the available sensing node has for receiving the sensing signals.

The antenna capabilities of an available sensing node may be related to the number of antennas and/or the number of antenna beams the available sensing node has for transmitting and/or receiving the sensing signals. The frequency capabilities of an available sensing node may be related to the frequency range and band aggregation the available sensing node has for transmitting and/or receiving the sensing signals. For example, regarding the frequency range capabilities, if most of the available sensing devices support a certain frequency range for sensing (e.g., frequency range 1), but an available sensing node can only support a different frequency range for sensing (e.g., frequency range 2), then the available sensing node may be excluded from the chosen subset of sensing nodes for the sensing of the target 1102 because the available sensing node will not be able to transmit and receive sensing signals to the other devices.

The movability capabilities of an available sensing node may be related to whether the available sensing node is capable of changing its location or position and/or its orientation. In at least one example, a coordinating node or scheduling node (e.g., an LMF, gNB, UE, or other device acting as a coordinating node or scheduling node) may control an available sensing node, which has the capability to relocate itself, to move from a location outside of a region of interest related to the target 1102 to a specific location that is within the region of interest related to the target 1102. In one example, the coordinating or scheduling node can send a message commanding the sensing node (e.g., a robot, an autonomous vehicle, etc.) to move to the location in the region of interest, and upon receiving the message, the sensing node can move to the location. In another example, the coordinating or scheduling node can send a message requesting the sensing node (e.g., a mobile device or other UE, a vehicle, etc.) to move to the location in the region of interest. Upon receipt of the message, the sensing node can display a notification requesting a user to move the sensing node to the location.

The self-positioning accuracy of an available sensing node may be based on an ability of the sensing node to receive certain signals (e.g., reference signals) or messages. In some cases, the self-positioning accuracy of an available sensing node may be based on a metric (e.g., a signal to noise (SNR) ratio, a reference signal received power (RSRP), etc.) of one or more positioning reference signals (PRSs) (e.g., transmitted from a base station, such as an eNB or gNB) or other signals (e.g., Global Navigation Satellite System (GNSS) or Global Positioning System (GPS) signals, RF sensing signals, etc.) received by the sensing node. In such cases, a scheduling node or coordinating node can determine that, because the available sensing node is able to receive clear reference signals (e.g., based on the SNR, RSRP, etc. of the signals, such as PRSs, received by the sensing node), the available sensing node is able to more accurately determine its own position. In one or more examples, an available sensing node may use various different geolocation techniques to determine its location including, but not limited to, GPS, monostatic sensing using RTT measurements, bistatic sensing, and/or multistatic sensing.

As described previously, the transmit/receive node 1106, operating as a scheduling node, may optimize the above-described factors to minimize a metric (e.g., a GDOP or other metric) for the RF sensing of the target 1102. For instance, in some aspects, the transmit/receive node 1106 (operating as a scheduling node) may determine or calculate the metric (e.g., a GDOP or other metric) for different subsets of sensing nodes of the available sensing nodes for performing the RF sensing of the target 1102. In some examples, the transmit/receive node 1104 may determine or calculate the metric (e.g., GDOP, etc.) of the different subsets of sensing nodes when operating as a location computation node. For such examples, the transmit/receive node 1106, when operating as a scheduling node, may exchange messaging (e.g., using appropriate protocols linking the scheduling node with the location computation node, such as LPP or NRPPa) with the transmit/receive node 1104, when operating as a location computation node, to receive the metric (e.g., GDOP) calculations performed by the location computation node. The scheduling node (e.g., transmit/receive node 1106) or the location computation node (e.g., the transmit/receive node 1104) can determine or calculate the GDOP of the different subsets using the techniques described above with respect to FIG. 10.

In one or more examples, the scheduling node (e.g., transmit/receive node 1106) or the location computation node (e.g., the transmit/receive node 1104) may determine or calculate the GDOP (or other metric) for the different subsets of sensing nodes of the available sensing nodes using an estimate of the location of the target based on prior knowledge of the location of the target. In some cases, the estimate of the location of the target may be obtained from previous sensing measurements taken of the target (e.g., which may be stored on the scheduling node or the location computation node). In other examples, the estimate of the location of the target may be determined by obtaining an representative value (e.g., average or mean, standard deviation, variance, etc.) of random samples (of GDOP) taken over a grid of the region(s) of interest related to the target 1102.

In addition or as an alternative to using an estimate of the location of the target 1102, the scheduling node (e.g., transmit/receive node 1106) or the location computation node (e.g., the transmit/receive node 1104) may determine or calculate the GDOP (or other metric) for the different subsets of sensing nodes of the available sensing nodes by iteratively using various different sensing algorithms. Examples of the different sensing algorithms may include monostatic sensing (e.g., with one sensing node performing RTT, such as the RTT monostatic sensing technique 700 of FIG. 7), multistatic sensing based on monostatic sensing (e.g., multiple sensing nodes each performing RTT as shown in the RTT multistatic sensing technique 702 of FIG. 7), bistatic sensing (e.g., multiple nodes performing TOA as shown in the bistatic sensing of FIG. 8), and/or other multistatic sensing (e.g., multiple nodes performing TDOA as shown in the multistatic sensing of FIG. 9). In some aspects, if any of the available sensing nodes have movable capabilities (e.g., are able to move locations or positions within an environment), the scheduling node (e.g., transmit/receive node 1106) or the location computation node (e.g., the transmit/receive node 1104) may iteratively use different possible positions and/or orientations for the movable available sensing nodes when calculating the GDOP (or other metric).

The scheduling node (e.g., transmit/receive node 1106) or the location computation node (e.g., the transmit/receive node 1104) may then determine the subset of sensing nodes that will be used as the subset that has the best metric (e.g., GDOP). Further details with respect to determining a subset of sensing nodes is described below with respect to FIG. 12.

Figure 12:
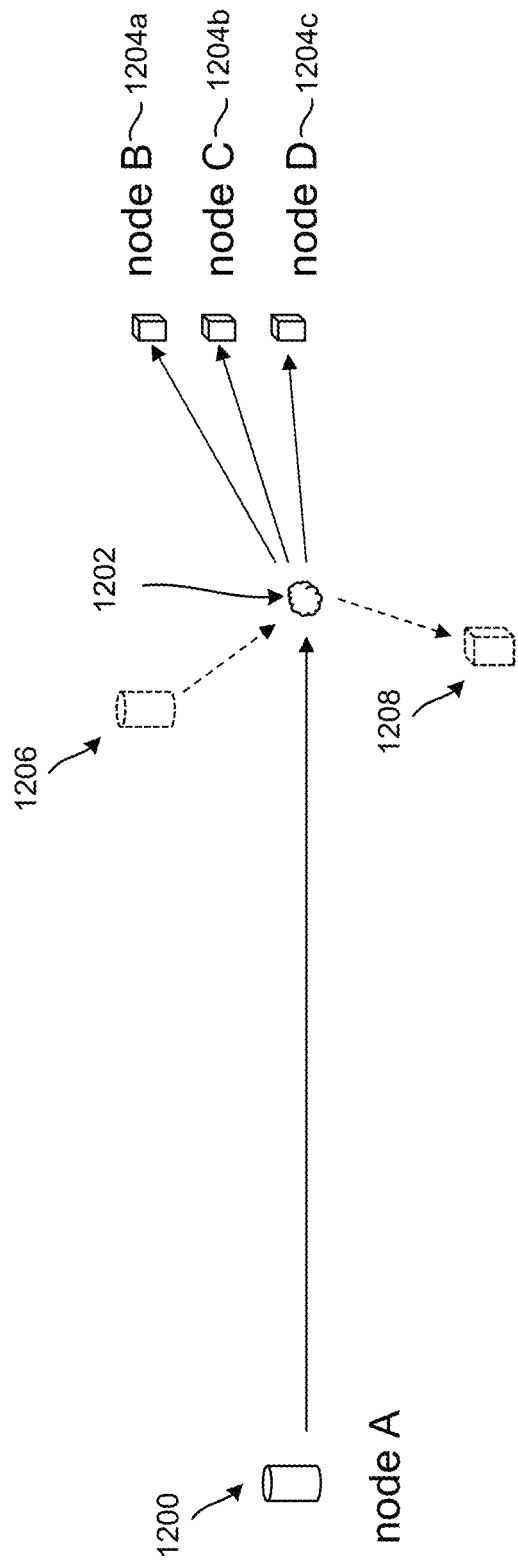
FIG. 12 is a diagram illustrating an example of selecting a subset of sensing devices (or nodes) for sensing a target for the disclosed systems and techniques for scheduling nodes for RF sensing, in accordance with some examples.

FIG. 12 is a diagram illustrating an example of determining or selecting a subset of sensing nodes (e.g., sensing nodes 1200, 1204a, 1204b, 1204c, 1206, 1208) for performing RF sensing of a target 1202 (e.g., a device-free object), in accordance with some examples. In FIG. 12, the sensing node 1200 is a transmit sensing node and is shown to be located a far distance away from the target 1202. The sensing nodes 1204a, 1204b, 1204c are receive sensing nodes and are located closer to the target 1202 as compared to transmit sensing node 1200. As shown, the receive sensing nodes 1204a, 1204b, 1204c are located on one side of the target 1202.

In order to improve the GDOP (or other metric) of the sensing system shown in FIG. 12, a scheduling node (not shown) may select the sensing node 1206, which is located closer to the target 1202 than the transmit sensing node 1200, to operate as a transmit sensing node for performing RF sensing of the target 1202 in replacement of the transmit sensing node 1200. The scheduling node may also select the sensing node 1208 (in addition to or as an alternative to the receive sensing nodes 1204a, 1204b, 1204c) to operate as a receive sensing node for the RF sensing because the sensing node 1208 is located on a different side of the target 1202 than the other receive sensing nodes 1204a, 1204b, 1204c. Placing an additional receive sensing node 1208 on a side of the target 1202 where other sensing nodes are not located will allow measurements of the target 1202 to be obtained from an additional position relative to the target 1202, which will lead to a better GDOP. In some examples, the scheduling node may instruct (e.g., by sending signaling with a command) the sensing node 1200 to move closer to the target 1202.

The scheduling node can iteratively perform the GDOP (or other metric) calculations using various different combinations of the available sensing nodes 1200, 1204a, 1204b, 1204c, 1206, 1208 (e.g., by determining the GDOP or other metric based on the various factors described above) and using various different sensing techniques to determine the best or optimal GDOP, as described above. Based on the iterative GDOP (or other metric) calculation, the scheduling node can determine the optimum subset of sensing nodes and RF sensing technique to be used for the performing RF sensing of the target 1202.

Figure 13:
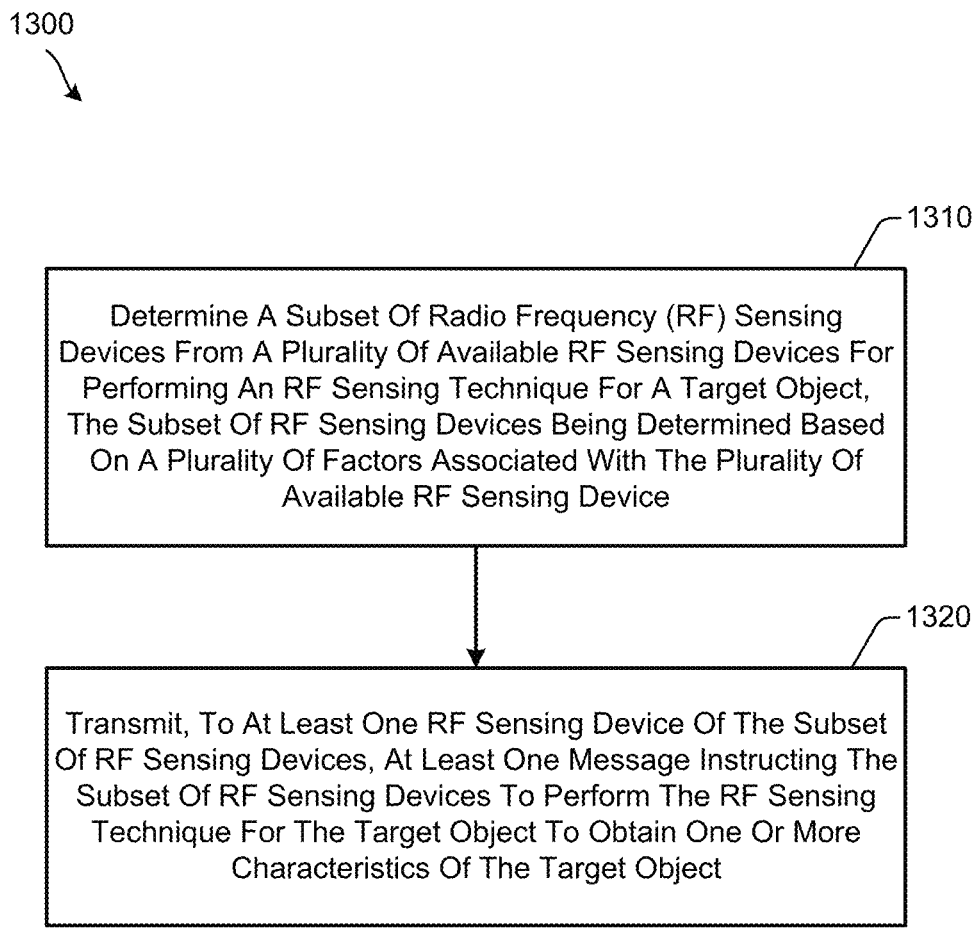
FIG. 13 is a flow chart illustrating an example of a process for wireless communications, in accordance with some examples.

FIG. 13 is a flow chart illustrating an example of a process 1300 for wireless communications. For instance, the process 1300 can be used for scheduling nodes for RF sensing, according to the systems and techniques described herein. The process 1300 can be performed by a computing device or apparatus, such as a wireless communications device (e.g., a UE) or a network entity (e.g., an eNB, a gNB, a location server such as an LMF, or a portion thereof, such as one or more of a CU, a DU, a RU, a Near-RT RIC, or a Non-RT RIC.). For instance, as described above, the computing device or apparatus can operate as a scheduling node and/or a coordinating node when performing the process 1300.

At block 1302, the computing device may determine a subset of radio frequency (RF) sensing devices from a plurality of available RF sensing devices for performing an RF sensing technique for a target object. For instance, the computing device may determine the subset of RF sensing devices based on a plurality of factors associated with the plurality of available RF sensing devices. In some aspects, the plurality of factors include one or more regions of interest related to the target object, self-positioning accuracy of each of the plurality of available RF sensing devices, one or more capabilities of each of the plurality of available RF sensing devices, any combination thereof, and/or other factors. The one or more capabilities of each of the plurality of available RF sensing devices can include transmit functionality, receive functionality, duplexing capabilities, time variance of the one or more capabilities, antenna capabilities, frequency capabilities, movability capabilities, any combination thereof, and/or other capabilities. In some aspects, the computing device may receive one or more capabilities of each of the plurality of available RF sensing devices. For instance, the computing device may receive the capabilities of each RF sensing device from the respective RF sensing device.

In some aspects, the computing device may determine the subset of RF sensing devices from the plurality of available RF sensing devices based on the plurality of factors at least in part by determining a metric associated with performing RF sensing of the target object based on the plurality of factors. In some cases, the metric includes a geometric dilution of precision (GDOP) associated with performing RF sensing of the target object. For example, the computing device may determine a respective metric for each subset of a plurality of subsets of RF sensing devices from the plurality of available RF sensing devices based on the plurality of factors. The computing device may determine the subset of RF sensing devices for performing the RF sensing technique for the target object based on the respective metric determined for each subset of the plurality of subsets of RF sensing devices. For instance, the computing device may determine that the subset of RF sensing devices has the best GDOP out of the plurality of subsets of RF sensing devices. As noted above, in some examples, the metric may be determined at least in part based on an estimate of a location of the target object based on prior knowledge of the location of the target object.

In some examples, the computing device can determine, based on the plurality of factors, the RF sensing technique to be used by the subset of RF sensing devices to obtain the one or more characteristics of the target object. In such cases, the computing device can determine the subset of RF sensing devices and the RF sensing technique that will be used by the subset of RF sensing devices. In some aspects, the RF sensing technique includes a monostatic RF sensing, a bistatic RF sensing, or other type of multistatic RF sensing technique. In performing the RF sensing technique, the computing device may utilize a round trip time (RTT), time of arrival (TOA), or time difference of arrival (TDOA) measurements.

At block 1304, the computing device may transmit, to at least one RF sensing device of the subset of RF sensing devices, at least one message instructing the subset of RF sensing devices to perform the RF sensing technique for the target object to obtain one or more characteristics of the target object. The one or more characteristics include at least one of a location of the target object, a velocity of the target object, a heading of the target object, any combination thereof, and/or other characteristics.

In some cases, the computing device may receive, from a requesting device, a request to obtain the one or more characteristics of the target object. For instance, as shown in FIG. 11, the transmit/receive node 1104 may transmit a request to the transmit/receive node 1106 to facilitate RF sensing to obtain the one or more characteristics of the target object 1102. In some cases, the computing device may receive, from the requesting device, the one or more regions of interest related to the target object (e.g., as part of the plurality of factors). The computing device may then determine the plurality of available RF sensing devices located within the one or more regions of interest.

In some aspects, the computing device may receive RF sensing measurements from at least one RF sensing device of the subset of RF sensing devices based on the RF sensing technique performed by the subset of RF sensing devices for the target object. For instance, the subset of RF sensing devices may perform monostatic, bistatic, or other multistatic RF sensing technique (e.g., using RTT, TOA, TDOA, etc.) to obtain the RF sensing measurements. The subset of RF sensing devices may transmit the RF sensing measurements to the computing device (e.g., the transmit/receive nodes 1100a-1100d transmitting the RF sensing measurements to transmit/receive node 1106). In some cases, the computing device may then determine the one or more characteristics of the target object using the RF sensing measurements. In some cases, the computing device may transmit the RF sensing measurements to another computing device (e.g., a requesting device) for determining the one or more characteristics of the target object using the RF sensing measurements. For example, the transmit/receive nodes 1100a-1100d may transmit the RF sensing measurements to the transmit/receive node 1106, and the transmit/receive node 1106 may send the RF sensing measurements to the transmit/receive node 1104. The transmit/receive node 1106 may then use the RF sensing measurements to determine the one or more characteristics of the target object 1102.

Figure 14:
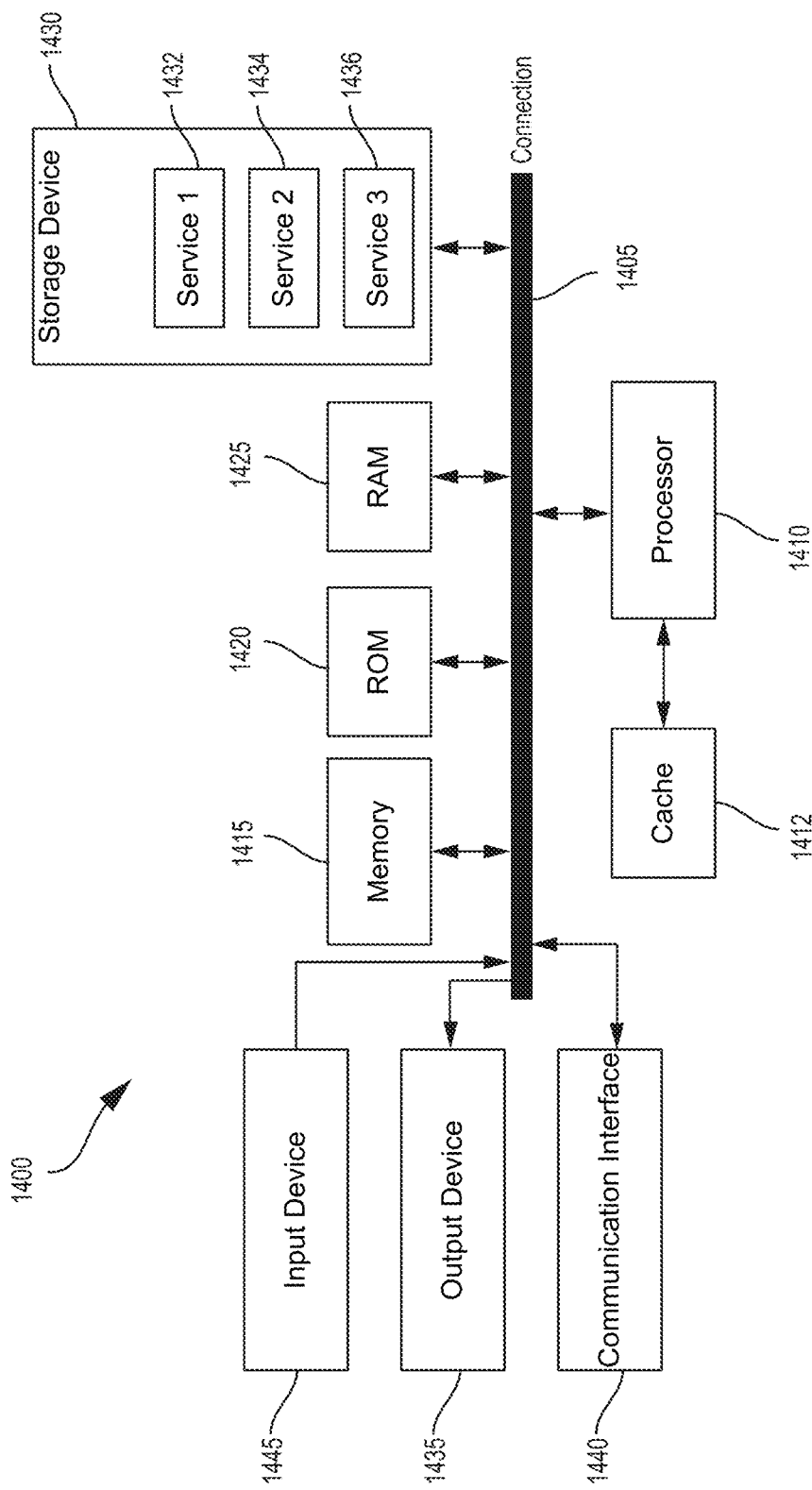
FIG. 14 is a block diagram illustrating an example of a computing system that may be employed by the disclosed system for scheduling nodes for RF sensing, in accordance with some examples.

FIG. 14 is a block diagram illustrating an example of a computing system 1400 that may be employed by the disclosed system for scheduling nodes for RF sensing, in accordance with some examples. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that communicatively couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400.

Computing system 1400 can include communications interface 1440, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1440 may also include one or more range sensors (e.g., light detection and ranging (LIDAR) sensors, laser range finders, RF radars, ultrasonic sensors, and infrared (IR) sensors) configured to collect data and provide measurements to processor 1410, whereby processor 1410 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1: A method for wireless communications, the method comprising: determining a subset of radio frequency (RF) sensing devices from a plurality of available RF sensing devices for performing an RF sensing technique for a target object, the subset of RF sensing devices being determined based on a plurality of factors associated with the plurality of available RF sensing devices; and transmitting, to at least one RF sensing device of the subset of RF sensing devices, at least one message instructing the subset of RF sensing devices to perform the RF sensing technique for the target object to obtain one or more characteristics of the target object.

Aspect 2: The method of Aspect 1, wherein determining the subset of RF sensing devices from the plurality of available RF sensing devices based on the plurality of factors includes determining a metric associated with performing RF sensing of the target object based on the plurality of factors.

Aspect 3: The method of Aspect 2, wherein the metric includes a geometric dilution of precision (GDOP) associated with performing RF sensing of the target object.

Aspect 4: The method of any of Aspects 2 or 3, further comprising: determining a respective metric for each subset of a plurality of subsets of RF sensing devices from the plurality of available RF sensing devices based on the plurality of factors; and determining, based on the respective metric determined for each subset of the plurality of subsets of RF sensing devices, the subset of RF sensing devices from the plurality of available RF sensing devices for performing the RF sensing technique for the target object.

Aspect 5: The method of any of Aspects 2 to 4, wherein the metric is determined at least in part based on an estimate of a location of the target object based on prior knowledge of the location of the target object.

Aspect 6: The method of any of Aspects 1 to 5, wherein the plurality of factors comprise at least one of one or more regions of interest related to the target object, self-positioning accuracy of each of the plurality of available RF sensing devices, or one or more capabilities of each of the plurality of available RF sensing devices.

Aspect 7: The method of Aspect 6, wherein the one or more capabilities of each of the plurality of available RF sensing devices comprise at least one of transmit functionality, receive functionality, duplexing capabilities, time variance of the one or more capabilities, antenna capabilities, frequency capabilities, or movability capabilities.

Aspect 8: The method of any of Aspects 1 to 7, wherein the one or more characteristics include at least one of a location of the target object, a velocity of the target object, or a heading of the target object.

Aspect 9: The method of any of Aspects 1 to 8, further comprising: determining, based on the plurality of factors, the RF sensing technique to be used by the subset of RF sensing devices to obtain the one or more characteristics of the target object.

Aspect 10: The method of any of Aspects 1 to 9, wherein the RF sensing technique comprises at least one of monostatic RF sensing, bistatic RF sensing, or multistatic RF sensing utilizing at least one of round trip time (RTT), time of arrival (TOA), or time difference of arrival (TDOA) measurements.

Aspect 11: The method of any of Aspects 1 to 10, further comprising: receiving, from a requesting device, a request to obtain the one or more characteristics of the target object.

Aspect 12: The method of any of Aspects 1 to 11, further comprising: receiving, from a requesting device, one or more regions of interest related to the target object, wherein the plurality of factors include the one or more regions of interest.

Aspect 13: The method of Aspect 12, further comprising: determining the plurality of available RF sensing devices located within the one or more regions of interest.

Aspect 14: The method of any of Aspects 1 to 13, further comprising: receiving one or more capabilities of each of the plurality of available RF sensing devices, wherein the plurality of factors include the one or more capabilities.

Aspect 15: The method of any of Aspects 1 to 14, further comprising: receiving RF sensing measurements from at least one RF sensing device of the subset of RF sensing devices based on the RF sensing technique performed by the subset of RF sensing devices for the target object; and determining the one or more characteristics of the target object using the RF sensing measurements.

Aspect 16: The method of any of Aspects 1 to 15, further comprising: receiving RF sensing measurements from at least one RF sensing device of the subset of RF sensing devices based on the RF sensing technique performed by the subset of RF sensing devices for the target object; and transmitting the RF sensing measurements to a computing device for determining the one or more characteristics of the target object using the RF sensing measurements.

Aspect 17: An apparatus for wireless communications comprising: at least one memory; and at least one processor coupled to the at least one memory and configured to: determine a subset of radio frequency (RF) sensing devices from a plurality of available RF sensing devices for perform an RF sensing technique for a target object, the subset of RF sensing devices be determined based on a plurality of factors associated with the plurality of available RF sensing devices, and transmit, to at least one RF sensing device of the subset of RF sensing devices, at least one message instructing the subset of RF sensing devices to perform the RF sensing technique for the target object to obtain one or more characteristics of the target object.

Aspect 18: The apparatus of Aspect 17, wherein, to determine the subset of RF sensing devices from the plurality of available RF sensing devices based on the plurality of factors, the at least one processor is configured to determine a metric associated with performing RF sensing of the target object based on the plurality of factors.

Aspect 19: The apparatus of Aspect 18, wherein the metric includes a geometric dilution of precision (GDOP) associated with performing RF sensing of the target object.

Aspect 20: The apparatus of any of Aspects 18 or 19, wherein the at least one processor is configured to: determine a respective metric for each subset of a plurality of subsets of RF sensing devices from the plurality of available RF sensing devices based on the plurality of factors; and determine, based on the respective metric determined for each subset of the plurality of subsets of RF sensing devices, the subset of RF sensing devices from the plurality of available RF sensing devices for perform the RF sensing technique for the target object.

Aspect 21: The apparatus of any of Aspects 18 to 20, wherein the at least one processor is configured to determine the metric at least in part based on an estimate of a location of the target object based on prior knowledge of the location of the target object.

Aspect 22: The apparatus of any of Aspects 17 to 21, wherein the plurality of factors comprise at least one of one or more regions of interest related to the target object, self-positioning accuracy of each of the plurality of available RF sensing devices, or one or more capabilities of each of the plurality of available RF sensing devices.

Aspect 23: The apparatus of Aspect 22, wherein the one or more capabilities of each of the plurality of available RF sensing devices comprise at least one of transmit functionality, receive functionality, duplexing capabilities, time variance of the one or more capabilities, antenna capabilities, frequency capabilities, or movability capabilities.

Aspect 24: The apparatus of any of Aspects 17 to 23, wherein the one or more characteristics include at least one of a location of the target object, a velocity of the target object, or a heading of the target object.

Aspect 25: The apparatus of any of Aspects 17 to 24, wherein the at least one processor is configured to: determine, based on the plurality of factors, the RF sensing technique to be used by the subset of RF sensing devices to obtain the one or more characteristics of the target object.

Aspect 26: The apparatus of any of Aspects 17 to 25, wherein the RF sensing technique comprises at least one of monostatic RF sensing, bistatic RF sensing, or multistatic RF sensing utilizing at least one of round trip time (RTT), time of arrival (TOA), or time difference of arrival (TDOA) measurements.

Aspect 27: The apparatus of any of Aspects 17 to 26, wherein the at least one processor is configured to: receive, from a requesting device, a request to obtain the one or more characteristics of the target object.

Aspect 28: The apparatus of any of Aspects 17 to 27, wherein the at least one processor is configured to: receive, from a requesting device, one or more regions of interest related to the target object, wherein the plurality of factors include the one or more regions of interest.

Aspect 29: The apparatus of Aspect 28, wherein the at least one processor is configured to: determine the plurality of available RF sensing devices located within the one or more regions of interest.

Aspect 30: The apparatus of any of Aspects 17 to 29, wherein the at least one processor is configured to: receive one or more capabilities of each of the plurality of available RF sensing devices, wherein the plurality of factors include the one or more capabilities.

Aspect 31: The apparatus of any of Aspects 17 to 30, wherein the at least one processor is configured to: receive RF sensing measurements from at least one RF sensing device of the subset of RF sensing devices based on the RF sensing technique performed by the subset of RF sensing devices for the target object; and determine the one or more characteristics of the target object use the RF sensing measurements.

Aspect 32: The apparatus of any of Aspects 17 to 31, wherein the at least one processor is configured to: receive RF sensing measurements from at least one RF sensing device of the subset of RF sensing devices based on the RF sensing technique performed by the subset of RF sensing devices for the target object; and transmit the RF sensing measurements to a compute device for determine the one or more characteristics of the target object use the RF sensing measurements.

Aspect 33: The apparatus of any of Aspects 17 to 32, wherein the apparatus is configured as a user equipment (UE), and further comprising: a transceiver configured to transmit the at least one message.

Aspect 34: The apparatus of any of Aspects 17 to 33, wherein the apparatus is configured as a network entity, and further comprising: a transceiver configured to transmit the at least one message.

Aspect 35: An apparatus for wireless communications, comprising means for performing operations in accordance with any one of Aspects 1 to 34.

Aspect 36: A non-transitory computer-readable medium comprising instructions that, when executed by an apparatus, cause the apparatus to perform operations in accordance with any one of Aspects 1 to 34.

What is claimed is:

1. An apparatus for wireless communications, comprising:
    at least one memory; and
    at least one processor coupled to the at least one memory and configured to:
        determine a subset of radio frequency (RF) sensing devices from a plurality of available RF sensing devices for performing an RF sensing technique for a target object, the subset of RF sensing devices being determined based on a plurality of factors associated with the plurality of available RF sensing devices; and
        transmit, to at least one RF sensing device of the subset of RF sensing devices, at least one message instructing the subset of RF sensing devices to perform the RF sensing technique for the target object to obtain one or more characteristics of the target object.

2. The apparatus of claim 1, wherein, to determine the subset of RF sensing devices from the plurality of available RF sensing devices based on the plurality of factors, the at least one processor is configured to determine a metric associated with performing RF sensing of the target object based on the plurality of factors.

3. The apparatus of claim 2, wherein the metric includes a geometric dilution of precision (GDOP) associated with performing RF sensing of the target object.

4. The apparatus of claim 2, wherein the at least one processor is configured to:
    determine a respective metric for each subset of a plurality of subsets of RF sensing devices from the plurality of available RF sensing devices based on the plurality of factors; and
    determine, based on the respective metric determined for each subset of the plurality of subsets of RF sensing devices, the subset of RF sensing devices from the plurality of available RF sensing devices for performing the RF sensing technique for the target object.

5. The apparatus of claim 2, wherein the metric is determined at least in part based on an estimate of a location of the target object based on prior knowledge of the location of the target object.

6. The apparatus of claim 1, wherein the plurality of factors comprise at least one of one or more regions of interest related to the target object, self-positioning accuracy of each of the plurality of available RF sensing devices, or one or more capabilities of each of the plurality of available RF sensing devices.

7. The apparatus of claim 6, wherein the one or more capabilities of each of the plurality of available RF sensing devices comprise at least one of transmit functionality, receive functionality, duplexing capabilities, time variance of the one or more capabilities, antenna capabilities, frequency capabilities, or movability capabilities.

8. The apparatus of claim 1, wherein the one or more characteristics include at least one of a location of the target object, a velocity of the target object, or a heading of the target object.

9. The apparatus of claim 1, wherein the at least one processor is configured to:
    determine, based on the plurality of factors, the RF sensing technique to be used by the subset of RF sensing devices to obtain the one or more characteristics of the target object.

10. The apparatus of claim 1, wherein the RF sensing technique comprises at least one of monostatic RF sensing, bistatic RF sensing, or multistatic RF sensing utilizing at least one of round trip time (RTT), time of arrival (TOA), or time difference of arrival (TDOA) measurements.

11. The apparatus of claim 1, wherein the at least one processor is configured to:
    receive, from a requesting device, a request to obtain the one or more characteristics of the target object.

12. The apparatus of claim 11, wherein the at least one processor is configured to:
    receive, from the requesting device, one or more regions of interest related to the target object, wherein the plurality of factors include the one or more regions of interest.

13. The apparatus of claim 12, wherein the at least one processor is configured to:
    determine the plurality of available RF sensing devices located within the one or more regions of interest.

14. The apparatus of claim 1, wherein the at least one processor is configured to:
    receive one or more capabilities of each of the plurality of available RF sensing devices, wherein the plurality of factors include the one or more capabilities.

15. The apparatus of claim 1, wherein the at least one processor is configured to:
    receive RF sensing measurements from at least one RF sensing device of the subset of RF sensing devices based on the RF sensing technique performed by the subset of RF sensing devices for the target object; and
    determine the one or more characteristics of the target object using the RF sensing measurements.

16. The apparatus of claim 1, wherein the at least one processor is configured to:
    receive RF sensing measurements from at least one RF sensing device of the subset of RF sensing devices based on the RF sensing technique performed by the subset of RF sensing devices for the target object; and
    transmit the RF sensing measurements to a computing device for determining the one or more characteristics of the target object using the RF sensing measurements.

17. The apparatus of claim 1, wherein the apparatus is configured as a user equipment (UE), and further comprising:

a transceiver configured to transmit the at least one message.

18. The apparatus of claim 1, wherein the apparatus is configured as a network entity, and further comprising:
a transceiver configured to transmit the at least one message.

19. A method for wireless communications, the method comprising:
determining a subset of radio frequency (RF) sensing devices from a plurality of available RF sensing devices for performing an RF sensing technique for a target object, the subset of RF sensing devices being determined based on a plurality of factors associated with the plurality of available RF sensing devices; and
transmit, to at least one RF sensing device of the subset of RF sensing devices, at least one message instructing the subset of RF sensing devices to perform the RF sensing technique for the target object to obtain one or more characteristics of the target object.

20. The method of claim 19, wherein determining the subset of RF sensing devices from the plurality of available RF sensing devices based on the plurality of factors includes determining a metric associated with performing RF sensing of the target object based on the plurality of factors.

21. The method of claim 20, the metric includes a geometric dilution of precision (GDOP) associated with performing RF sensing of the target object.

22. The method of claim 20, further comprising:
determining a respective metric for each subset of a plurality of subsets of RF sensing devices from the plurality of available RF sensing devices based on the plurality of factors; and
determining, based on the respective metric determined for each subset of the plurality of subsets of RF sensing devices, the subset of RF sensing devices from the plurality of available RF sensing devices for perform the RF sensing technique for the target object.

23. The method of claim 19, wherein the plurality of factors comprise at least one of one or more regions of interest related to the target object, self-positioning accuracy of each of the plurality of available RF sensing devices, or one or more capabilities of each of the plurality of available RF sensing devices.

24. The method of claim 19, wherein the one or more characteristics include at least one of a location of the target object, a velocity of the target object, or a heading of the target object.

25. The method of claim 19, further comprising:
determining, based on the plurality of factors, the RF sensing technique to be used by the subset of RF sensing devices to obtain the one or more characteristics of the target object.

26. The method of claim 19, further comprising:
receiving, from a requesting device, a request to obtain the one or more characteristics of the target object.

27. The method of claim 26, further comprising:
receiving, from the requesting device, one or more regions of interest related to the target object, wherein the plurality of factors include the one or more regions of interest.

28. The method of claim 27, further comprising:
determining the plurality of available RF sensing devices located within the one or more regions of interest.

29. The method of claim 19, further comprising:
receiving RF sensing measurements from at least one RF sensing device of the subset of RF sensing devices based on the RF sensing technique performed by the subset of RF sensing devices for the target object; and
determining the one or more characteristics of the target object use the RF sensing measurements.

30. The method of claim 19, further comprising:
receiving RF sensing measurements from at least one RF sensing device of the subset of RF sensing devices based on the RF sensing technique performed by the subset of RF sensing devices for the target object; and
transmitting the RF sensing measurements to a compute device for determine the one or more characteristics of the target object use the RF sensing measurements.

* * * * *